United States Patent
Gonczi et al.

(10) Patent No.: US 10,990,310 B2
(45) Date of Patent: Apr. 27, 2021

(54) SUB-BLOCK DATA DEDUPLICATION

(71) Applicant: EMC IP Holding Company LLC, Hopkinton, MA (US)

(72) Inventors: Istvan Gonczi, Berkley, MA (US); Ivan Bassov, Brookline, MA (US); Sorin Faibish, Newton, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 160 days.

(21) Appl. No.: 16/393,061

(22) Filed: Apr. 24, 2019

(65) Prior Publication Data

US 2020/0341668 A1    Oct. 29, 2020

(51) Int. Cl.
*G06F 7/00* (2006.01)
*G06F 3/06* (2006.01)
*G06F 9/54* (2006.01)

(52) U.S. Cl.
CPC .......... *G06F 3/0641* (2013.01); *G06F 3/0608* (2013.01); *G06F 3/0673* (2013.01); *G06F 9/544* (2013.01)

(58) Field of Classification Search
CPC .... G06F 3/0641; G06F 3/0608; G06F 3/0673; G06F 9/544
USPC .......................................... 707/600–899, 692
See application file for complete search history.

(56) References Cited

U.S. PATENT DOCUMENTS

2015/0012503 A1* 1/2015 Akirav ................ G06F 16/1748
707/692

OTHER PUBLICATIONS

Sorin Faibish, "Elastically Managing Cache for Sub-Block Deduplication," U.S. Appl. No. 16/176,703, filed Nov. 15, 2018.
Philippe Armangau, "Deduplicating Data At Sub-Block Granularity," U.S. Appl. No. 16/176,729, filed Nov. 15, 2018.

* cited by examiner

*Primary Examiner* — Isaac M Woo
(74) *Attorney, Agent, or Firm* — Muirhead and Saturnelli, LLC

(57) ABSTRACT

Techniques for data processing may include: determining one or more sub-blocks of a target block that match one or more sub-blocks of a candidate block; creating a shared sub-block mapping (SSM) structure having a plurality of entries, wherein each of the plurality of entries corresponds to a different one of the sub-blocks in the candidate block and wherein a value stored in said each entry, corresponding to one of the sub-blocks of the candidate block, identifies a sub-block of the target block matching said one sub-block of the candidate block; and storing the candidate block as a deduplicated block sharing at least one sub-block with the target block. The SSM structure may be stored as a metadata structure of the candidate block to identify deduplicated sub-blocks of the candidate block and to identify sub-blocks of the target block providing content for the deduplicated sub-blocks of the candidate block.

20 Claims, 11 Drawing Sheets

SUB-BLOCK DATA DEDUPLICATION

BACKGROUND

Technical Field

This application generally relates to data storage and, more particularly, data deduplication techniques.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing data. A candidate block is received. Processing determines one or more sub-blocks of a target block that match one or more sub-blocks of the candidate block. A shared sub-block mapping (SSM) structure is created having a plurality of entries, wherein each of the plurality of entries corresponds to a different one of the sub-blocks in the candidate block and wherein a value stored in said each entry, corresponding to one of the sub-blocks of the candidate block, identifies a sub-block of the target block matching said one sub-block of the candidate block. The candidate block is stored as a deduplicated block sharing at least one sub-block with the target block. The SSM structure is stored as a metadata structure of the candidate block to identify deduplicated sub-blocks of the candidate block and to identify sub-blocks of the target block providing content for the deduplicated sub-blocks of the candidate block. Processing may include comparing each sub-block of the candidate block to one or more sub-blocks of the target block to determine whether said each sub-block of the candidate block matches one of the sub-blocks of the target block. Processing may include comparing a first digest for a first sub-block of the candidate block to one or more digests for one or more sub-blocks of the target block to determine whether the first digest matches a second of the one or more digests for the one or more sub-blocks of the target block; responsive to determining the first digest for the first sub-block of the candidate block matches the second digest for a second sub-block of the target block, comparing the first sub-block of the candidate block to the second sub-block of the target block; and determining, in accordance with said comparing the first sub-block of the candidate block to the second sub-block of the target block, whether the first sub-block of the candidate block and the second sub-block of the target block match. Processing may include, responsive to determining the first sub-block of the candidate block matches the second sub-block of the target block, updating an entry of the SSM structure corresponding to the first sub-block of the candidate block to indicate that the second sub-block of the target block matches the first sub-block of the candidate block. Updating may include storing a positional indicator of the second sub-block of the target block in the entry of the SSM structure corresponding to the first sub-block of the candidate block. Processing may include comparing a first digest for a first sub-block of the candidate block to a plurality of digests for a plurality of sub-blocks of the target block to determine whether the first digest matches any of the plurality of digests for the plurality of sub-blocks of the target block; responsive to determining the first digest for the first sub-block of the candidate block does not match any of the plurality of digests for the plurality of sub-blocks of the target block, determining that the first sub-block does not match any of the plurality of sub-blocks of the target block; and responsive to determining, that the first sub-block does not match any of the plurality of sub-blocks of the target block, updating an entry of the SSM structure corresponding to the first sub-block of the candidate block to indicate that the first sub-block of the candidate block does match any of the plurality of sub-blocks of the candidate block. Entropy values for the sub-blocks of the candidate block and the target block may be used as digests for the sub-blocks of the candidate block and the target block. Each sub-block of the candidate block and each sub-block of the target block may have a corresponding one of the entropy values, and the first digest for the first sub-block of the candidate block and the one or more digests for one or more sub-blocks of the target block are included in the entropy values. Processing may include computing, using the SSM structure, a similarity metric with respect to the candidate block and the target block, the similarity metric indicating a number of sub-blocks in the candidate block having content matching a sub-block of the target block; determining whether the similarity metric exceeds a threshold; and responsive to determining the similarity metric exceeds the threshold, performing said storing the candidate block as a deduplicated block sharing at least one sub-block with the target block. The target block may be a first target block and wherein the SSM structure may be a first SSM structure that identifies which one or more sub-blocks of the target block match which one or more sub-blocks of the candidate block. The processing may include creating a second SSM structure that identifies which one or more sub-blocks of a second target block match which one or more sub-blocks of the candidate block, wherein the second SSM structure has a second plurality of entries, wherein each of the second plurality of entries corresponds to a different one of the sub-blocks in the candidate block and wherein a value stored in said each entry, corresponding to one of the sub-blocks of the candidate block, identifies a sub-block of the second target block matching said one sub-block of the candidate block; determining whether all sub-blocks of the candidate block are deduplicable using the first target block and the second target block whereby each sub-block of the candidate block matches another sub-block in either the first target block or the second target block; and responsive to determining that all sub-blocks of the candidate block are deduplicable using the first target block and the second target block, storing the candidate block as a deduplicated block sharing at least one sub-block with the first target block and at least one sub-block with the second target block, wherein said storing includes storing the first SSM structure and the second SSM structure as metadata structures of the candidate block to identify deduplicated sub-blocks of the candidate block and to identify sub-blocks of the first target block and the second target block providing content for the deduplicated sub-blocks of the candidate block. Processing may further include responsive to determining that all sub-blocks of the candidate block are not deduplicable using the first target block and the second target block, whereby at least one sub-block of the candidate block does not match any sub-block of the first target block or the second target block, performing first processing to select one of the first target block and the second target block to be used in deduplicating the candidate block. The first processing may include computing, using the first SSM structure, a first similarity metric with respect to the candidate block and the first target block, the first similarity metric indicating a number of sub-blocks in the candidate block having content matching a sub-block of the first target block; computing, using the second SSM structure, a second similarity metric with respect to the candidate block and the second target block, the second similarity metric indicating a number of sub-blocks in the candidate block having content matching a sub-block of the second target block; comparing the first similarity metric and the second similarity metric; and selecting, in accordance with said comparing the first similarity metric and the second similarity metric, one of the first target block and the second target block to be used in deduplicating the candidate block. The first similarity metric may be greater than the second similarity metric and selecting may select the first target block to be used in deduplicating the candidate block. If said comparing determines that the second similarity metric is greater than the first similarity metric, said selecting may select the second target block to be used in deduplicating the candidate block. If the first similarity metric is equal to the second similarity metric, said selecting may randomly selects one of the first target block and the second target block to be used in deduplicating the candidate block.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
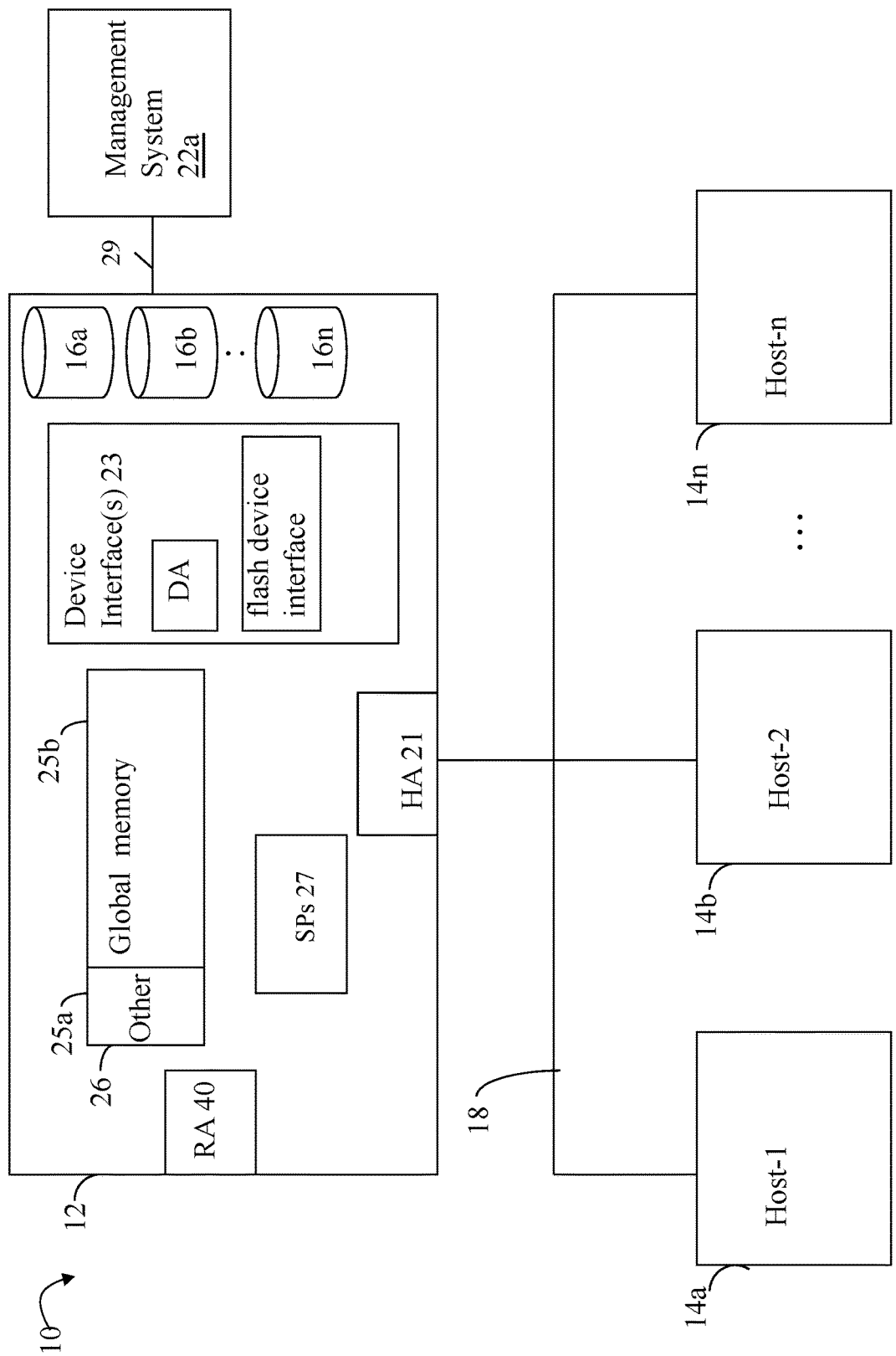
FIGS. 1 and 2B are examples of components that may be included in a system in accordance with techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on stored user data. For example, the data storage system may perform one or more data reduction operations, such as data deduplication and compression, as well as other types of operations or services. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication and compression techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 cryptographic hashing algorithm known in the art. Data deduplication generally refers to removing redundant or duplicate data portions. Data deduplication techniques may include looking for duplicate data blocks whereby only a single instance of the data block is retained (stored on physical storage) and where pointers or references may be used in connection with duplicate or redundant copies (which reference or identify the single stored instance of the data block).

Figure 2A:
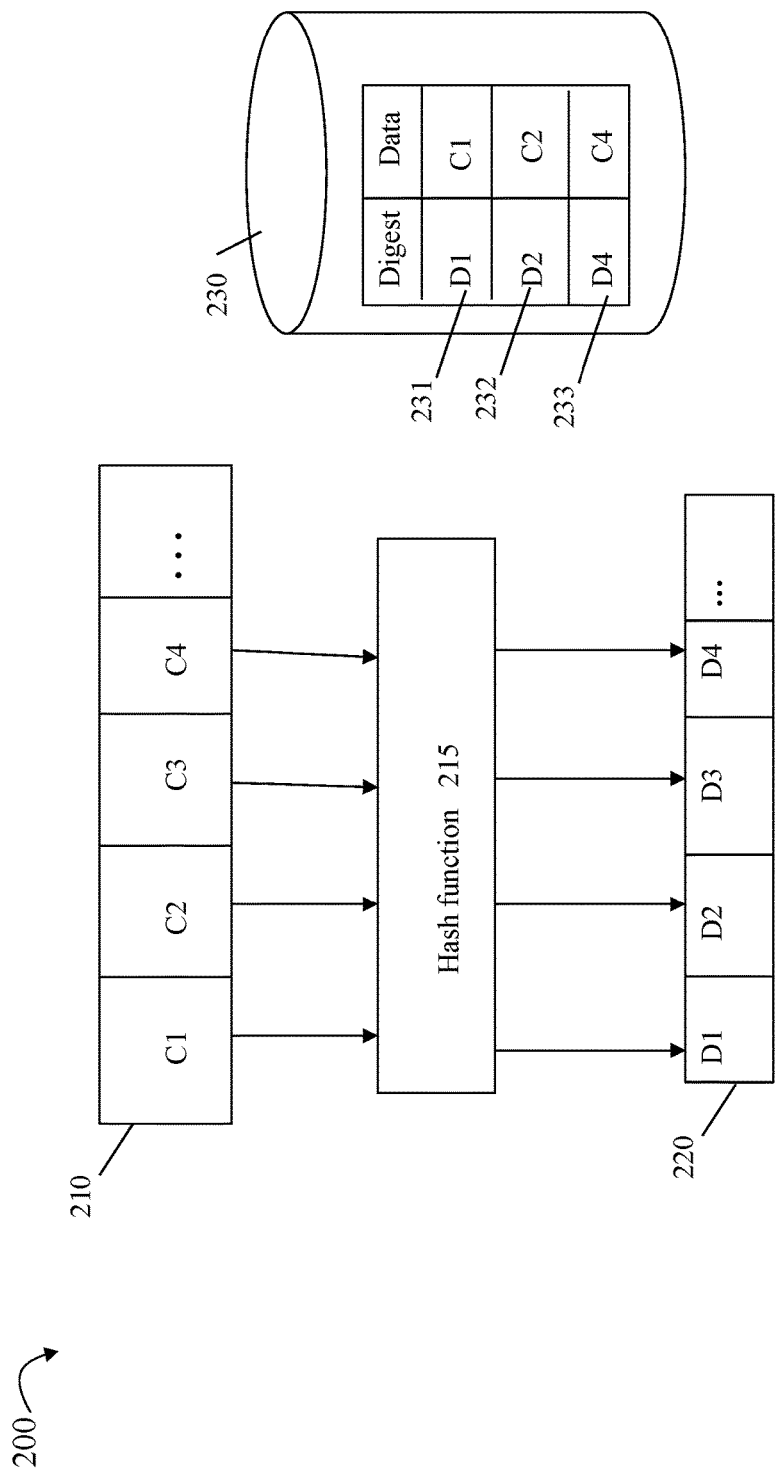
FIG. 2A is an example illustrating data deduplication as may be performed in an embodiment in accordance with techniques herein.

Referring to the FIG. 2A, shown is an example 200 illustrating processing that may be performed in connection with data deduplication processing in an embodiment in accordance with techniques herein. The element 210 may denote the original data being written or stored on back-end non-volatile storage. The original data may be partitioned into multiple data blocks C1, C2, C3, C4 and the like. In at least one embodiment and for purposes of illustration, the data blocks may all be the same size where the size may vary with embodiment. As a variation depending on the data deduplication technique utilized, the blocks of 210 may be of varying or different sizes. Each block is provided as an input to hash function 215. As noted above, in at least one embodiment, the hash function 215 may be the SHA-256 hashing algorithm, or more generally, any suitable cryptographic, or non-cryptographic hashing function known in the art. For each block of 210, the hash function 215 may perform processing and generate, as an output, a hash value or digest. The element 220 includes digests D1, D2, D3, D4, and the like, where a corresponding different one of the digests DN is generated for one of the blocks CN (where "N" is an integer denoting the block and associated digest generated for that block). For example, D1 is the digest generated for C1, D2 is the digest generated for C2, D3 is the digest generated for C3, and so on. Generally, a hash function 215 is selected which has an acceptably low probability of a "hash collision" of generating the same digest or hash value for two different blocks. The strength of the hash function 215 may be measured by the unlikelihood of a collision occurring where two different input blocks of data produce the same digest. The strength increases with the bit length of the hash value or digest. Thus, if two blocks, such as C1 and C3, have the same digests whereby D1=D3, then blocks C1 and C3 match (e.g., are identical matching data blocks). If two blocks, such as C1 and C4, have different digests whereby D1 does not equal D4, then blocks C1 and C4 do not match (e.g., are different or non-matching data blocks). In cases where two matching or identical blocks have the same digest, only a single copy of the data block is stored on backend non-volatile physical storage of the data storage system. The single stored instance of the data block may be referenced using a pointer, handle, the digest of the block, and the like.

The element 230 of the FIG. 2A may denote the data store, such as a data base (DB) used to store data blocks. In this example, as noted above, assume blocks C1 and C3 are the same with remaining blocks C2 and C4 being unique. In at least one embodiment, element 230 may be organized and managed using a data structure, such as a hash table. In at least one embodiment, computed digests, or portions thereof, may be used as an index into the hash table where the single unique instances of data blocks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the block of data may be mapped by hash function 215, and thus by the block's digest, to a particular entry in the table at which the block of data is stored. To further illustrate, the hash function 215 may be used to generate a hash value or digest for a particular data block. The digest is then further mapped (e.g., such as by another mathematical function, using particular portions of the digest, and the like) to a particular index or entry of the hash table. The particular mapping used to map the digest to a corresponding table entry varies, for example, with the digest and the size of hash table.

When storing a new data block, such as C1, its digest may be mapped to a particular hash table entry 231 whereby if the table entry is null/empty, or otherwise does not already include a data block matching C1, then C1 is stored in the table entry along with its associated digest D1 (this is the first time block C1 is recorded in the data store 230). Otherwise, if there is already an existing entry in the table including a data block matching C1, it indicates that the new data block is a duplicate of an existing block. In this example as noted above, processing is performed for C1, C2, and C4 respectively, where entries 231, 232, and 233 are added since there are no existing matching entries in the hash table. When processing block C3, as noted above, C3 has a digest D3 matching D1 whereby C3 (and thus D3) maps to entry 231 of the hash table already including a matching block C1 (so no additional data block is added to 230 for C3 since C3 is determined as a duplicate of C1). In connection with representing a particular file or other storage entity including multiple duplicate occurrences of a particular block such as C3, the single instance or copy of the data may be stored in 230. Additionally, a handle or reference, such as identifying the hash table entry 231, its digest, and the like, may be used to reference the single instance or copy of the data storage in 230. When reconstructing or restoring data to its original form, the handle or reference into the hash table for block C3 may be used to obtain the actual C3 block of data from 230.

Figure 2B:
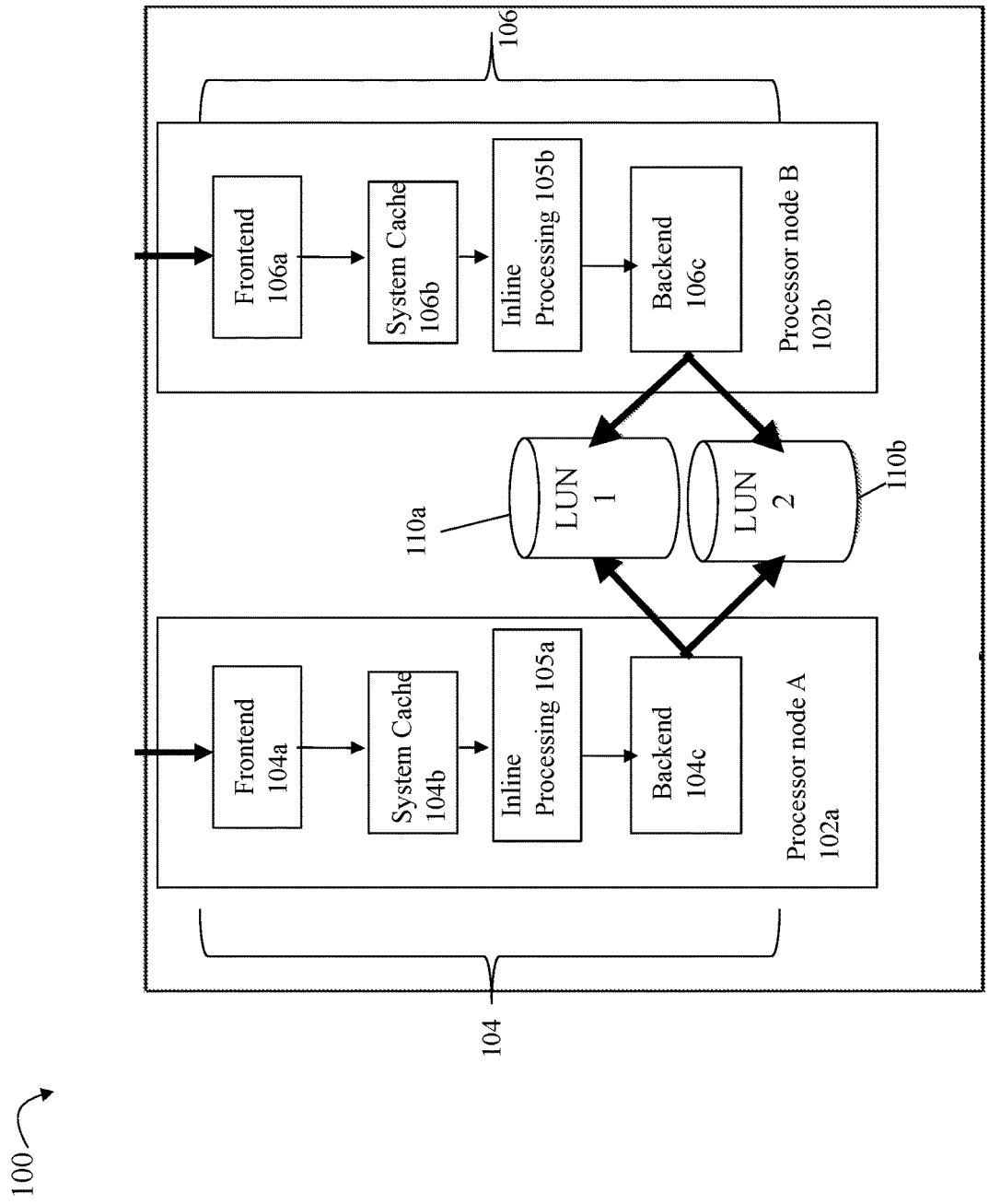

With reference to the FIG. 2B, shown is an example 100 illustrating components that may be included in the data path in at least one existing data storage system in accordance with the techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include performing compression and data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. The elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component 104a). At various points in time, the WP data stored in the system cache is flushed or written out to the physical storage 110a, 110b. In connection with the inline processing layer 105a, prior to storing the original data on the physical storage 110a, 110b, compression and data deduplication processing may be performed that converts the original data (as stored in the system cache prior to inline processing) to a resulting form (that may include compressed and/or deduplicated portions) which is then written to physical storage 110a, 110b. In at least one embodiment, when deduplication processing determines that a portion (such as a block) of the original data is a duplicate of an existing data portion already stored on 110a, 110b, that particular portion of the original data is not stored in a compressed form and may rather be stored in its deduplicated form (e.g., there is no need for compression of a block determined to be duplicate of another existing block). If the original data portion is not a duplicate of an existing portion already stored on 110a, 110b, the original data portion may be compressed and stored in its compressed form on 110a, 110b.

In connection with a read operation to read a block of data, a determination is made as to whether the requested read data block is stored in its original form (in system cache 104b or on physical storage 110a, 110b), or whether the requested read data block was previously deduplicated or compressed. If the requested read data block (which is stored in its original decompressed, non-deduplicated form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block was previously deduplicated, the read data block is recreated and stored in the system cache in its original form so that it can be returned to the host. If the requested read data block was previously compressed, the block is first decompressed prior to sending the read data block to the host. If the compressed read data block is already stored in the system cache, the data is uncompressed to a temporary or buffer location, the uncompressed data is sent to the host, and the buffer or temporary location is released. If the compressed read data block is not in the system cache but stored on the physical storage 110a, 110b, the compressed read data block may be read from the physical storage 110a, 110b into the system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

In connection with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/ processor cache) as well as other cache levels (e.g., the LLC) as described herein. Portions of the LLC may be used, for example, to initially cache write data which is then flushed to the backend physical storage.

When the processor performs processing, such as in connection with the inline processing 105a, 105b as noted above, data may be loaded from the main memory and/or other lower cache levels into its CPU cache. In particular, inline compression (ILC) and inline data deduplication (ILD) may be performed as part of the inline processing 105a, 105b. In at least one embodiment, the size of a data block processed by ILC and ILD may be 4096 bytes=4 kB (kilobytes) in size.

Some existing implementations of deduplication use a deduplication data store (dedupe data store or DB) as described in connection with the element 230 of the FIG. 2A having a hash table organized by indices which are randomly distributed so that updates, retrievals, and other data access operations can be costly. The data store may be stored on backend non-volatile storage PDs which can be costly (in terms of time) to access when performing data deduplication processing. To improve performance, some existing implementations may use caching to cache portions of the data store. However, the entire data store is typically not capable of being stored completely in the cache due to the often large size of the data store as compared to the limited size of the cache. Additionally, any cached portion of the data store may not be persistently stored where the cache thus requires repopulation upon reboot of the system.

At least one existing implementation may perform data deduplication at the data block level of granularity, for example, where each entry of the data store 230 is mapped to a single unique data block. As used herein, a target data block, target block or dedupe target refers to a single unique instance of a data block currently stored in the dedupe data store 230. A candidate data block, candidate block or dedupe candidate refers to a data block for which deduplication processing is performed with the goal of eliminating duplicate candidate blocks from being stored. A digest may be computed for the candidate data block using a hash function whereby the digest identified the candidate data block with a high level of uniqueness, even though the digest is typically much smaller than the candidate data block itself. Digests thus enable data block matching between the candidate and target data blocks in the dedupe data store 230 to proceed quickly and efficiently. Consistent with discussion above, for each digest in the dedupe data store 230, the data store 230 stores a pointer that leads to a stored version of the respective target data block. To perform deduplication on a particular candidate block, a storage system computes a digest of the candidate block and searches the dedupe data store 230, or a cached version thereof, for an entry that matches the computed digest. If a match is found, the storage system may then compare the actual content of the target block with the content of the candidate block to ensure the target and candidate data blocks having matching content. If the target and candidate data blocks having matching content, processing may arrange metadata of the candidate block to point to the target data block that the dedupe data store 230 has associated with the matching digest. In this manner, a duplicate copy of the data block is avoided.

The foregoing where matching candidate and target data blocks are determined may be characterized as a full data block or full block deduplication at the data block level of granularity. For a candidate data block to be deduplicated using full block deduplication, the entire candidate block (e.g., all portions or sub-blocks of the candidate data block) must exactly match an existing target block. Furthermore, the position or location of each matching sub-block of the candidate block must correspond to the same position or location of the matching sub-block of the target block. For example, if the target block and candidate block each include 8 sub-blocks, sub-block "I" of the target block matches sub-block "I" of the candidate block, for all I=0 through 7, inclusively (e.g., with zero-based sub-block notation).

Unfortunately, deduplication schemes using only full block deduplication fail to detect redundant data when blocks are similar but not identical. For example, a data storage system may store two target data blocks which only differ by only one sub-block. As another example, full block deduplication fails to detect similar candidate and target data blocks where the candidate may include a single sub-block of the target block, or include multiple copies of the same sub-block of the target. Thus, using only full block deduplication, opportunities for deduplication of similar data blocks, but not full data block matches, are missed.

As such described in following paragraphs are improved techniques for performing data deduplication that operate at sub-block or sector level of granularity, for example, by searching a deduplication data store for a match between a candidate sub-block or sector of a candidate block and a target sub-block or sector of a previously-stored target block. The techniques in following paragraphs may be used to identify one or more duplicate sub-blocks of the target block matching one or more sub-blocks of the candidate block. In at least one embodiment, metadata in the form of a shared sub-block or sector mapping (SSM) structure may be used to identify what sub-block(s) of the target block are shared with what sub-block(s) of the candidate data block. In particular, the SSM structure identifies the particular sub-block of the target block that supplies the shared sub-block data to a particular sub-block of the candidate block. Thus, the SSM structure provides for flexible partial block or sub-block data deduplication of a candidate block with respect to a target block.

Described below are techniques that may be used for performing data deduplication that provide for a smaller or finer level of granularity for determining matching or duplicate data portions at the sub-block or sector level, sometimes referred to herein as partial deduplication, partial block deduplication, or sub-block deduplication. A data block in embodiments described below includes 8 sub-blocks identified as sub-blocks 0 through 7. Embodiments of techniques described herein for partial or sub-block deduplication may include calculating the sub-block or sector hashes for each candidate block and then searching the dedupe DB to determine whether one or more sub-blocks of the candidate matches one or more sub-blocks of a target block currently stored in the dedupe DB.

A block or data block as noted above is a unit of storage in a data storage system which generally corresponds to the smallest unit of storage space that can be allocated. Block sizes vary from one storage system to the next. In at least one embodiment in accordance with the technique herein, there are eight sub-blocks per block, and the sub-blocks are contiguous and uniform in size. For example, the block size may be 4 kB, where each of the 8 sub-blocks or sectors are 512 bytes.

Figure 3:
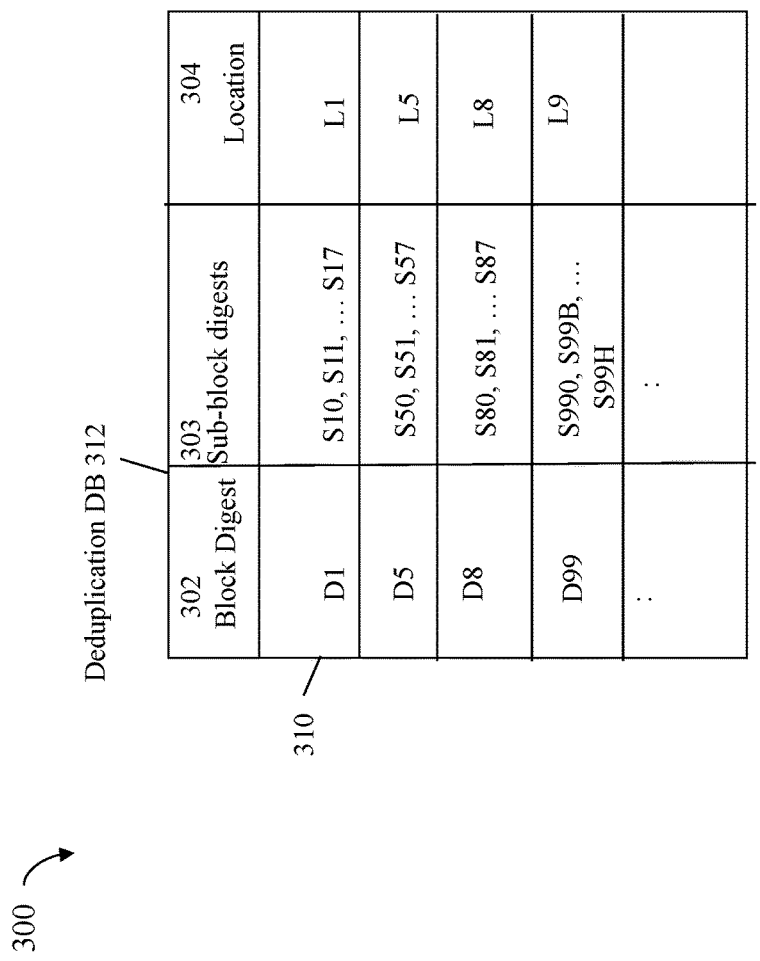
FIG. 3 is an example of structures that may be used in an embodiment in accordance with techniques herein.

Referring to FIG. 3, shown is an example 300 of the deduplication (dedupe) DB 312 that may be used in an embodiment in accordance with the techniques herein. The dedupe DB 312 is configured to store digests of the target blocks along with associated information. The dedupe DB 312 may include the following columns of information: the block digest 302, the sub-block or sector digests 303 and the location 304. Each entry or row of the dedupe DB 312 may include information for a different single target block. The dedupe DB 312 may be stored on persistent storage, such as non-volatile storage PDs. Additionally, all or a part of the dedupe DB 312 may be stored in cache for use in performing the techniques herein.

In at least one embodiment, the block digests of the column 302 may be computed using a first hash function, such as a cryptographic hash function, for each of the target data blocks. The sub-block digests of the column 303 may be computed using a second weaker hash function, such as a non-cryptographic hash function, that is generally weaker than the first hash function, whereby the second hash function has a higher hash collision rate or probability (e.g., that 2 inputs result in the same computed hash value or digest) than the first hash function.

The location 304 may take various forms. The location 304 may generally directly or indirectly identify a location (e.g., in memory or on persistent storage) where the content of a target data block is stored. For example, the location 304 may point to a memory location in the cache where the data block is temporarily being held. Alternatively, location 304 may point to metadata that is further mapped to the data block, such to a persistently stored version of the data block as stored on non-volatile physical storage, such as on one of the PDs 16a-n of FIG. 1. In this latter instance, the content of the target block may be obtained indirectly using the metadata. In some examples, the location may point directly to the data block stored persistently on non-volatile physical storage, such as on one of the PDs 16a-n of FIG. 1.

Figure 4:
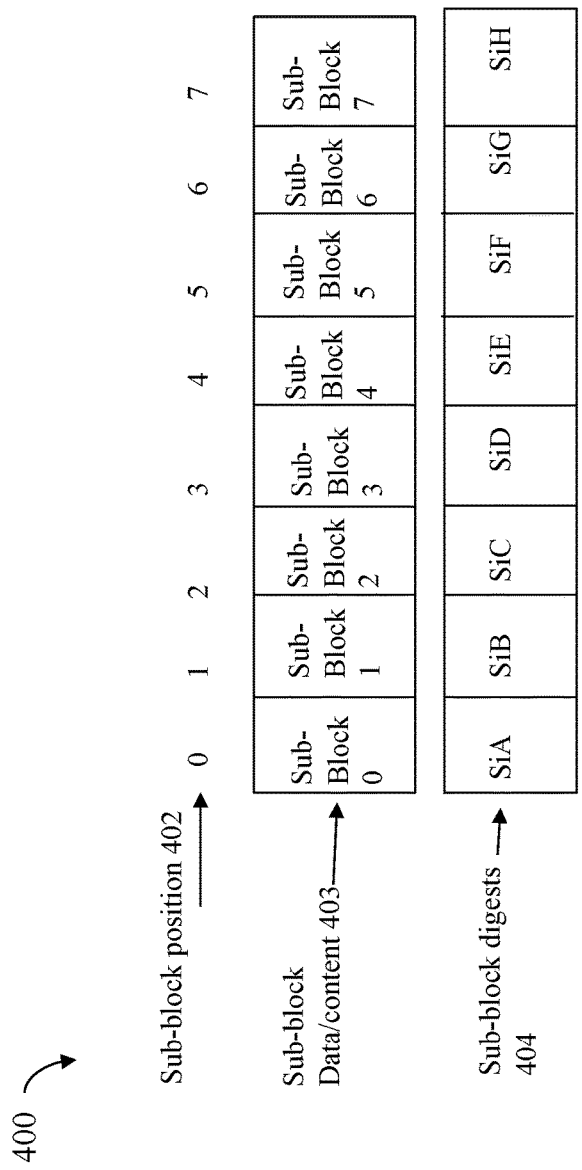
FIG. 4 is an example illustrating sub-blocks of a data block and associated sub-block digests that may be used in an embodiment in accordance with the techniques herein.

Referring to FIG. 4, shown is an example 400 illustrating the sub-block level digests for a data block in an embodiment in accordance with the techniques herein. The sub-block position 402 denotes the 8 sub-block positions, 0 through 7 inclusively, for a data block. The sub-block data or content 403 denotes the actual data of the 8 sub-blocks. For a unique target data block, notation may be used herein such as target block "i", where "i" is a positive integer. With respect to a particular target block "i", the sub-block digests corresponding, respectively, to the sub-blocks 0-7 for the target block "i" are denoted as SiA, SiB, SiC, SiD, SiE, SiF, SiG, and SiH. The sub-block digests 404 denote the 8 digests computed individually for the 8 sub-blocks of a target block "i". As illustrated by 404 in the FIG. 4, for the target block "i", SiA is the digest for sub-block 0, SiB as the digest for sub-block 1, SiC as the digest for sub-block 2, SiD as the digest for sub-block 3, SiE as the digest for sub-block 4, SiF as the digest for sub-block 5, SiG as the digest for sub-block 6, and SiH as the digest for sub-block 7.

To further illustrate, reference is made back to FIG. 3 to the row or entry 310 that includes the following information for a first target block, i=1:

D1 (in column 302) denoting the block digest (e.g., full block digest) computed using the first hash function where the input to the first hash function is all 8 sub-blocks of the first target block, 1;

S1A through S1H (in column 303) denoting the 8 sub-block or sector level hashes computed individually using the second hash function for each of the 8 sub-blocks or sectors of the first target block, 1; and L1 (in column 304) used to identify the location of the content the first target block, 1.

The dedupe DB 312 may be stored persistently on non-volatile storage and, as noted above, some or all of the dedupe DB 312 may be stored in a cache. The entries of the cached version of the dedupe DB 312 may identify a location of a target data block in cache or on non-volatile storage. In at least one embodiment, the cache may utilize an LRU (least-recently used) eviction policy. In at least one embodiment, when evicting an entry from the cached version of the dedupe DB 312 where the location of that entry identifies a cache location, the target data block referenced by the location of that entry may also be evicted from the cache. In at least one embodiment, deduplication processing may be performed using only the portion of the dedupe DB currently in the memory or the cache without retrieving other portions of the dedupe DB from the non-volatile storage. In other words, if a look up for a digest of a block is performed and there is no matching entry in column 302 in the cached portion of the dedupe DB 312, in such an embodiment there is no further lookup in the on-disk dedupe DB and processing determines that there is no entry in the dedupe DB for digest (e.g., block is unique and not a duplicate).

In at least one embodiment in accordance with the techniques herein, deduplication processing may include first performing full block deduplication processing to determine whether there is a full, identical or complete data block match between a target block and a candidate block for which deduplication processing is performed. Responsive to determining there is no full or complete match between a target block and a candidate block, partial or sub-block deduplication processing may be performed. In at least one embodiment, the entries of the dedupe DB 312 may be accessed using the block digest 302.

The digest entries in the column 302 of the dedupe DB 312 may denote digests used in connection with performing the full block deduplication processing in at least one embodiment in accordance with the techniques herein. The hash function or algorithm used to generate the full data block digests in an embodiment may generally be any suitable function having an acceptable expected hash collision probability or level of hash resistance. In at least one embodiment, the hash function used to compute full block digests of entries of the dedupe DB, and more generally, compute full block digests of data blocks for full block deduplication processing may be a cryptographic hash function such as SHA-1 or SHA-256.

When performing full block deduplication processing for a candidate block, at least one embodiment of the techniques herein may include computing the full block digest for the candidate block and comparing the computed full block digest for the candidate to the digest entries in column 302 of the dedupe DB 312 to determine whether there is a match between the computed full block digest for the candidate and a digest of column 302 of an entry for a target block of the dedupe cache 312. If a match is found, processing may then be performed to compare (e.g., byte-by-byte) the content of the candidate block with the content of the target block having the matching entry of the dedupe DB and ensure the actual data contents of the candidate and target blocks match. If the actual contents of the candidate and target blocks match, processing then proceeds to store the candidate block as a full deduplicated block (e.g., duplicate of the target block). If no complete full block match is found between a target block and the candidate block, partial or sub-block deduplication may be performed.

Consistent with discussion elsewhere herein, for a candidate block that is found to be unique (e.g., whereby there is no matching target block and no matching partial or sub-block deduplication performed), the candidate block may be stored as a new target block and processing may include persistently storing the content of the new target block and additionally storing digests for the new target block in the dedupe DB 312. In at least one embodiment, such processing for the new target block may include creating a corresponding entry for the new target block in the dedupe DB 312 including the block digest 302, sub-block level digests 304 and location 304 for the new target block.

What will now be described is the SSM structure, or mapping structure, that may be used in an embodiment in accordance with the techniques herein. The SSM structure is metadata that may be used to describe and identify shared sub-blocks between two data blocks, such as between a candidate data block and a target data block, where the candidate data block is partially deduplicated with respect to the target data block. Thus, a single SSM structure is used to describe the shared sub-block level data between a candidate block and a single target block. If an embodiment allows a single candidate block to share sub-blocks with multiple target blocks (e.g., where the multiple target blocks provide deduplicated data or eliminated data for the candidate block), a different SSM structure may be specified for each such target block sharing data with the candidate block. For simplicity of illustration, following paragraphs may make reference to use of a single SSM structure with a candidate block. More generally, an embodiment may set any suitable limit on the number of one or more target blocks allowed to share data with a single candidate block.

Figure 5:
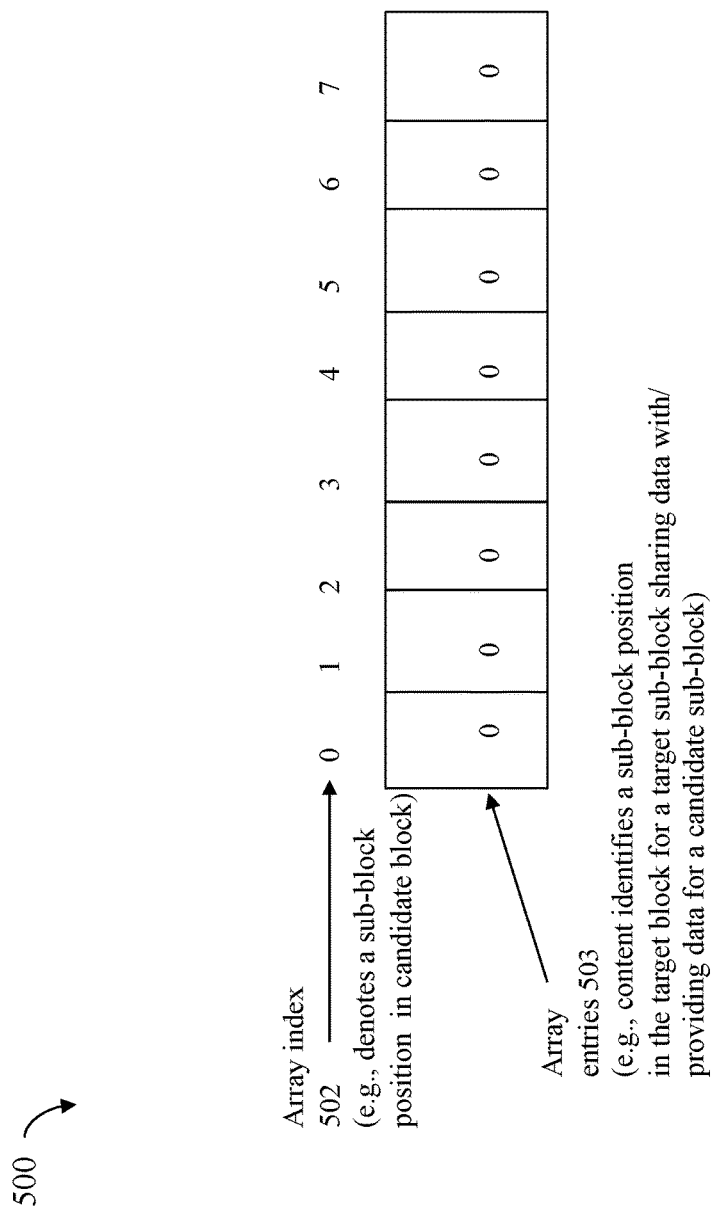
FIG. 5 is an example illustrating a shared sub-block or sector mapping (SSM) structure that may be used in an embodiment in accordance with the techniques herein.

In at least one embodiment, the SSM structure may be implemented as illustrated in the FIG. 5 as a single dimension array or vector having a number of cells or entries corresponding to the number of sub-blocks or sectors in a data block. The SSM structure implemented as the array or vector in the example 500 may have index values 502 corresponding to the various sub-block positions of the candidate data block. The contents of each of the array cells or entries 503 denote the sub-block positions in the target data block that provides or supplies data for the candidate. More specifically, for an SSM structure implemented as an array as in the example 500, the array index "j" denotes a sub-block position in the candidate data block that is deduplicated or shares data with a sub-block of the target denoted by the content of the array entry or cell having the index "j". For example, where SSM is an array, SSM[3]=5 indicates that candidate sub-block 3 is a duplicate of the target sub-block 5, whereby the target sub-block 5 supplies the data for candidate sub-block 3. In this manner, the candidate sub-block 3 is deduplicated or eliminated by the partial or sub-block deduplication. In at least one embodiment in which each block includes 8 sub-blocks, identified by positions 0 through 7, the content of an array entry a[j] may be:

an integer in the range 0 through 7, denoting the target sub-block matching candidate sub-block [j]; or a special or reserved value denoting that no target sub-block matches the candidate sub-block j.

The special or reserved value denoting a non-matching sub-block of the candidate (non-matching with respect to the sub-blocks of the target block) may be any suitable value that is not allowable content of an array entry or cell. Generally, the special value may be any integer that is not within the range of sub-block positions (e.g., not in the inclusive range 0-7 with reference to FIG. 5). For example, in at least one embodiment, the special value may be 0xFF, which is the hexadecimal number FF which has a integer value of 255.

Referring to FIG. 5, the array entries 503 indicate that sub-block 0 of the target block matches each sub-block of the candidate block. Thus, the same target sub-block 0 is mapped to all 8 sub-blocks of the candidate.

To further illustrate, consider the following example target and candidate blocks where unique sub-block content is denoted by one of the uppercase letters, A-G, and an upper case "X" for a sub-block indicates that the sub-block content is non-matching. Thus, a sub-block content of "X" in one candidate sub-block of the candidate block indicates that the candidate sub-block does not match any sub-block of the target block. In a similar manner, a sub-block content of "X" in one target sub-block of the target block indicates that the target sub-block does not match any sub-block of the candidate block.

As a first example, consider a target block=AXXXXXXX and a candidate block=AAAAAAAA. This first example has an SSM structure as illustrated in the array entries 503 in example 500 of FIG. 5, where all sub-blocks of the candidate data block are provided by sub-block 0 of the target block. In this first example, the entire candidate block may be deduplicated using the single sub-block 0 of the target block.

As a second example, consider a target block=AXXXXXXX and a candidate block=AAAAAAAX. The second example has an SSM structure encoded as an array or vector with content as follows: 0,0,0,0,0,0,0,0xFF, where each one of the foregoing 8 entries corresponds respectively to content of the 8 SSM entries. The second example differs from the first example in that the candidate also now has a unique non-dedupable last sub-block 7 as indicated by the special value 0xFF in the last entry of the SSM array (e.g., SSM[7]=0xFF). In this second example, the candidate sub-blocks 0-6 are deduplicated using sub-block 0 of the target block and, additionally, candidate sub-block 7 has unique content that is stored and cannot be deduplicated using the target block.

As a third example, consider a target block=ABCDEFGB and a candidate block=AABBGGXX. The third example has an SSM structure encoded as an array or vector with content as follows: 0,0,1,1,6,6,0XFF, 0xFF, where each one of the foregoing 8 entries corresponds respectively to content of the 8 SSM entries. In this third example's SSM structure having the following content: 0,0,1,1,6,6,0xFF, 0xFF:

SSM[0]=0 and SSM[1]=0 denoting that sub-block 0 of the target matches sub-blocks 0 and 1 of the candidate block;

SSM[2]=1 and SSM[3]=1 denoting that sub-block 1 of the target matches sub-blocks 2 and 3 of the candidate block;

SSM[4]=6 and SSM[5]=6 denoting that sub-block 6 of the target matches sub-blocks 4 and 5 of the candidate block; and SSM[6]=0XFF and SSM[7]=0xFF denoting that sub-blocks 6 and 7 of the candidate do not match any sub-block of the target.

In this third example, sub-blocks 0-5 of the candidate block are deduplicated using sub-blocks 0, 1 and 6 of the target block. Additionally candidate sub-blocks 6 and 7 have unique content that is stored and cannot be deduplicated using the target block.

In at least one embodiment, the comparison between sub-blocks of a particular target block and the candidate block may be done by comparing the content of the sub-blocks of target and candidate. More specifically, each sub-block of the candidate block may be compared to each sub-block of the target block until either a match is found for the candidate sub-block, or it has been determined that no sub-block of the target matches the candidate sub-block. For example, candidate sub-block 0 may be compared, at most, to all the target sub-blocks 0-7 whereby it is determined that candidate sub-block 0 does not match any target sub-block. Alternatively, the comparisons of the candidate sub-block 0 to the target sub-blocks 0-7 may otherwise stop once processing locates a target sub-block that matches candidate sub-block 0. The foregoing may be repeated for each of the remaining candidate sub-blocks 1 through 7. If each target block and candidate block contains N sub-blocks, there are at most $N^2$ comparisons made. In the worst case with 8 sub-blocks in the target and candidate blocks, there may be no match between a sub-block of the target and any sub-block of the candidate whereby 64 data content comparisons are performed and yield no deduplication. Thus, in the worst case in this example, 64*512 byte data comparisons are performed.

As an optimization to the foregoing, in at least one embodiment, the comparison between sub-blocks of a particular target block and the candidate block may include initially comparing the sub-block digests for sub-blocks of the target block and the candidate block. In this latter embodiment in which sub-block or sector level digests are used, processing may compute 8 digests for the 8 sub-blocks of the candidate block. For each sub-block of the candidate, the digest of the candidate sub-block may be compared to the digest of each target sub-block until either a matching digest of a target sub-block is found for the digest of the candidate sub-block, or it has been determined that no digest for a target sub-block matches the digest of the candidate sub-block. Once a digest of a target sub-block has been located that matches the digest of a candidate sub-block, a comparison is made between the content of the candidate sub-block and the target sub-bock to ensure a content match. In such an embodiment, the sub-block digests for the candidate sub-blocks may be computed using any suitable hash function, such as the second hash function described above used to compute sub-block digests or hashes in column 303 of the dedupe DB 312 for the target blocks. For example, in at least one embodiment, the second hash function may compute an entropy value for a sub-block whereby the entropy value is used as the digest for the sub-block. Entropy and techniques for computing entropy values are described in more detail elsewhere herein.

For a particular target block having an entry in the dedupe DB 312, the sub-block digests 303 for the target block may be obtained from the entry. For example, if the target block is target block 1 having the entry 310, the sub-block digests for the target block 1 may be obtained from column or field 303 of the entry 310. The sub-block digests in the column 303 for entry 310 may be used in subsequent processing to determine which one or more sub-blocks of the target block 1 match one or more sub-blocks of the candidate. More specifically, the digest for candidate sub-block 0 is compared to each target sub-block's digest. If it is determined that the digest of a target sub-block matches the digest for the candidate sub-block 0, then a comparison is made between the content of candidate sub-block 0 and the target sub-block to ensure that the candidate sub-block 0 matches the target sub-block (e.g. since two different sub-blocks may have the same digest). If all digests of target sub-blocks are compared to the digest of candidate sub-block 0 and no digest of a target sub-block matches the digest for the candidate sub-block 0, then it is determined that the target block contains no target sub-block matching the candidate sub-block 0. In a similar manner, processing is performed for the remaining candidate sub-blocks 1-7. The latter embodiment uses the optimization of comparing a digest of a target sub-block to a digest of a candidate sub-block to make an initial determination of whether the content of the target sub-block matches the candidate sub-block. The initial determination results in a reduced amount of data comparisons. For example, suppose the digests for the candidate sub-block and target sub-block are 8 bytes each. If the digests of the candidate sub-block and target sub-block do not match, the content of the candidate sub-block and the content of the target sub-block also do not match. If the digests of the candidate sub-block and target sub-block do match, the content of the candidate sub-block and the content of the target sub-block are compared for verification (since 2 different non-matching sub-blocks may have the same digest or hash value). Thus, in one case, for each candidate sub-block and 8 target sub-blocks, 64*8 bytes are compared along with comparing 512 bytes of the candidate sub-block to 512 bytes of a target sub-block.

An embodiment may encode the results of comparing the candidate sub-blocks to the target sub-blocks in the SSM structure, such as a vector or array as described herein and illustrated in FIG. 5. In this manner, the SSM structure may be used in embodiment performing data deduplication that may be characterized as positional independent deduplication whereby any source sub-block of the target can be mapped to any one or more candidate sub-blocks. The SSM structure generally represents the mapping or supply of target sub-blocks to candidate sub-blocks. The SSM structure denotes the data content comparison between the candidate and target data blocks. Additionally, the SSM structure denotes the sub-block granularity matches or particular shared sub-blocks between the target and the candidate blocks.

Generally, an embodiment may use any suitable technique to select one or more target blocks from the dedupe DB 312 to be used in connection with partial deduplication processing with respect to a candidate data block. With reference back to the FIG. 3, once a particular target block is selected, such as denoted by the entry 310, processing may be performed to obtain the target block content using the location 304 for the target block's entry in the dedupe DB 312. Once the target block content has been obtained, processing may be performed as described above between sub-blocks of the target and candidate blocks. In some examples herein, an SSM structure determined with respect to a candidate block B1 and a target block T1 may be represented as SSM (B1, T1).

Given the SSM (B1, T1) structure computed with respect to a particular target block T1 and candidate block B1, a similarity metric may be defined as the count or number of sub-blocks in the candidate block having content matching a sub-block in the target block. Put another way, the similarity metric identifies the number of sub-blocks of the candidate block that are deduplicated with respect to the particular target block. More formally, the similarity metric, SIM may be defined as:

SIM (B1, T1)=the number of sub-blocks in the candidate block B1 having content matching a sub-block of the target block T1.

The value of SIM(B1,T1) is an integer in the range 0-N, where N denotes the number of sub-blocks in each of the target and candidate data blocks. In at least one embodiment where there are 8 sub-blocks in the target data block T1 and the candidate data block B1, SIM(B1,T1) is an integer in the range 0-8.

In at least one embodiment, a threshold level T of similarity may be specified denoting a minimum number of sub-blocks of the candidate block that are deduplicated with respect to the target block. In such an embodiment, in order to perform the partial or sub-block deduplication of the candidate block B1 with respect to a target block T1, SIM (B1, T1) needs to be greater than the threshold level T. For example, in one embodiment the threshold level T may be 2. In such an embodiment, reference is made back to the first example noted above where SIM(B1, T1)=8. In this case, the candidate data block is deduplicated with respect to the target since the SIM(B1, T1)=8, which exceeds the threshold level T=2.

Reference is made back to the second example noted above where SIM(B1, T1)=7. In this case, the candidate data block is deduplicated with respect to the target since the SIM(B1, T1)=7, which exceeds the threshold level T=2.

Reference is made back to the third example noted above where SIM(B1, T1)=6. In this case, the candidate data block is deduplicated with respect to the target since the SIM(B1, T1)=6, which exceeds the threshold level T=2.

In at least one embodiment where a first target block T1 has been selected for potential deduplication with respect to a candidate block B1 and the SIM(B1, T1) is not greater than the threshold level T, processing may determine not to perform sub-block deduplication of B1 with respect to T1 and may continue by further considering a next target block B2. The target block B2 may be processed in a manner similar to the first target block T1. In at least one embodiment, such processing may repeatedly examine and evaluate multiple target blocks until at least one target block has an associated similarity metric SIM (with respect to the candidate block) that exceeds the threshold level T.

In at least one embodiment, for a candidate block B1, if a single target block T1 has been determined to have a similarity metric SIM(B1, T1)>threshold level T, then processing may perform sub-block deduplication of the candidate block using the single target block T1.

In at least one embodiment, for a candidate block B1, assume 2 target blocks T1 and T2 have been determined whereby both T1 and T2 collectively provide all sub-blocks of B1 whereby B1 may be completely deduplicated, then processing may perform sub-block deduplication of the candidate block using the both the target blocks T1 and T2.

In at least one embodiment, for a candidate block B1, assume 2 target blocks T1 and T2 have been determined but both T1 and T2 collectively do not provide all sub-blocks of B1. In this case, a single one of the 2 target blocks may be selected for sub-block deduplication of B1 using the similarity metric SIM. More specifically, the target block resulting in the larger similarity metric SIM may be selected. More formally, if SIM (B1, T1)>SIM (B1, T2) then T1 is selected for sub-block deduplication of B1. If SIM (B1, T1)<SIM (B1, T2) then T2 is selected for sub-block deduplication of B1. If SIM (B1, T1)=SIM (B1, T2) then one of T1 or T2 may be randomly selected for sub-block deduplication of B1.

What will now be described is entropy and how entropy may be calculated in at least one embodiment in accordance with the techniques herein for use in connection with determining sub-block or sector digests. As described above, the second hash function used to compute sub-block digests may be a non-cryptographic hash function. In at least one embodiment, the second hash function may compute an entropy value for a sub-block or sector to use as the digest for the sub-block or sector in connection with the techniques herein.

Information entropy may be characterized as the average rate at which information is produced by a stochastic source of data. The definition of entropy used in information theory is analogous to the definition used in statistical thermodynamics. The concept of information entropy was introduced by Claude Shannon in "A Mathematical Theory of Communication", The Bell System Technical Journal (Volume: 27, Issue: 3, July 1948; pages 379-423). The measure of information entropy associated with each possible data value may be expressed as the negative logarithm of the probability function for the value. When the data source has a lower-probability value (i.e., when a low-probability event occurs), the event carries more "information" ("surprisal") than when the source data has a higher-probability value. The amount of information conveyed by each event defined in this way becomes a random variable whose expected value is the information entropy. Generally, entropy refers to disorder or non-uniformity. As a metric, an entropy value denotes a measure of the randomness of data, or a random distribution of symbols. As discussed elsewhere herein, the higher the entropy value for a data block, the more irregular or random the distribution of bits within the data block. In contrast, the lower the entropy value for the data block, the more uniform the distribution of the bits within the data block.

The relationship between entropy and compressibility is discussed, for example, in "Relationship Between Entropy and Test Data Compression", Kedarnath J. Balakrishnan and Nur A. Touba, IEEE Transactions on Computer-Aided Design of Integrated Circuits and Systems, Vol. 26, No. 2, February 2007, pages 386-395, and "Entropy and Compressibility of Symbol Sequences", Werner Ebeling, PhysComp96 (Physics and Computation 1996), Feb. 23, 1997, both of which are incorporated by reference herein. As explained in "Relationship between Entropy and Test Data Compression", entropy of a data set is a measure of the amount of information in the data set. Entropy calculations for fully specified data have been used to get a theoretical bound on how much the data can be compressed. In "Relationship between Entropy and Test Data Compression", the concept of entropy is extended for incompletely specified test data that has unspecified or don't care bits. "Entropy and Compressibility of Symbol Sequences" investigates long-range correlations in symbol sequences using methods of statistical physic and non-linear dynamics.

Entropy, H, with respect to a data set may be expressed as:

$$H = -\Sigma_{i=0}^{N-1} P_i \log_2(P_i) \qquad \text{EQUATION 1}$$

where $P_i$ is the probability of occurrence of symbol $X_i$ in the data set;

N is the total number of unique symbols; and $\log_2$ is the base 2 logarithm.

Generally, entropy for the data set depends on the symbol length L. Assume the data set is partitioned into sections where each section includes L bits of data. Thus L denotes number of bits in each section and L also denotes the length of the symbol. For a given symbol length, entropy for the data may be calculated to provide a value that denotes an expected or predicted level of compressibility for the data. Note that $P_i$, the probability of symbol $X_i$, refers to the actual frequency of the symbol $X_i$ in the data set. Thus, $P_i$ for $X_i$ may be calculated as the frequency or number of times $X_i$ appears in the data set divided by the total number of sections in the data set.

Although particular values are selected for purposes of illustration, more generally, the entropy value used with techniques herein may be determined for any size data block or data set that may include symbols of any suitable number of bits (e.g., any symbol length) having any number of unique symbols.

In at least one embodiment in accordance with techniques herein, L may be 8 where each symbol may include 8 bits (e.g., have a symbol length of 8). In such an embodiment, each symbol or bit pattern of 8 bits denotes a byte of information having a numerical data value (base 10) in the range from 0 to 255, inclusively. In such an embodiment, N, the number of unique symbols (e.g., numerical value of bit patterns) is 256, and EQUATION 1 for calculating entropy, H, may be expressed as:

$$H = -\sum_{i=0}^{255} P_i \log_2(P_i) \qquad \text{EQUATION 2}$$

The entropy values calculated using EQUATION 1 and EQUATION 2 are (e.g., real numbers) within the inclusive range of 0 to 8. For a given data set, the larger the entropy value (e.g., closer to 8), the more random the data; and the smaller or lower the entropy value (e.g., close to 0), the more uniform the data.

In at least one embodiment, an entropy value may be determined for each sub-block of a target block and each sub-block of a candidate block processing using the techniques herein.

Figure 6:
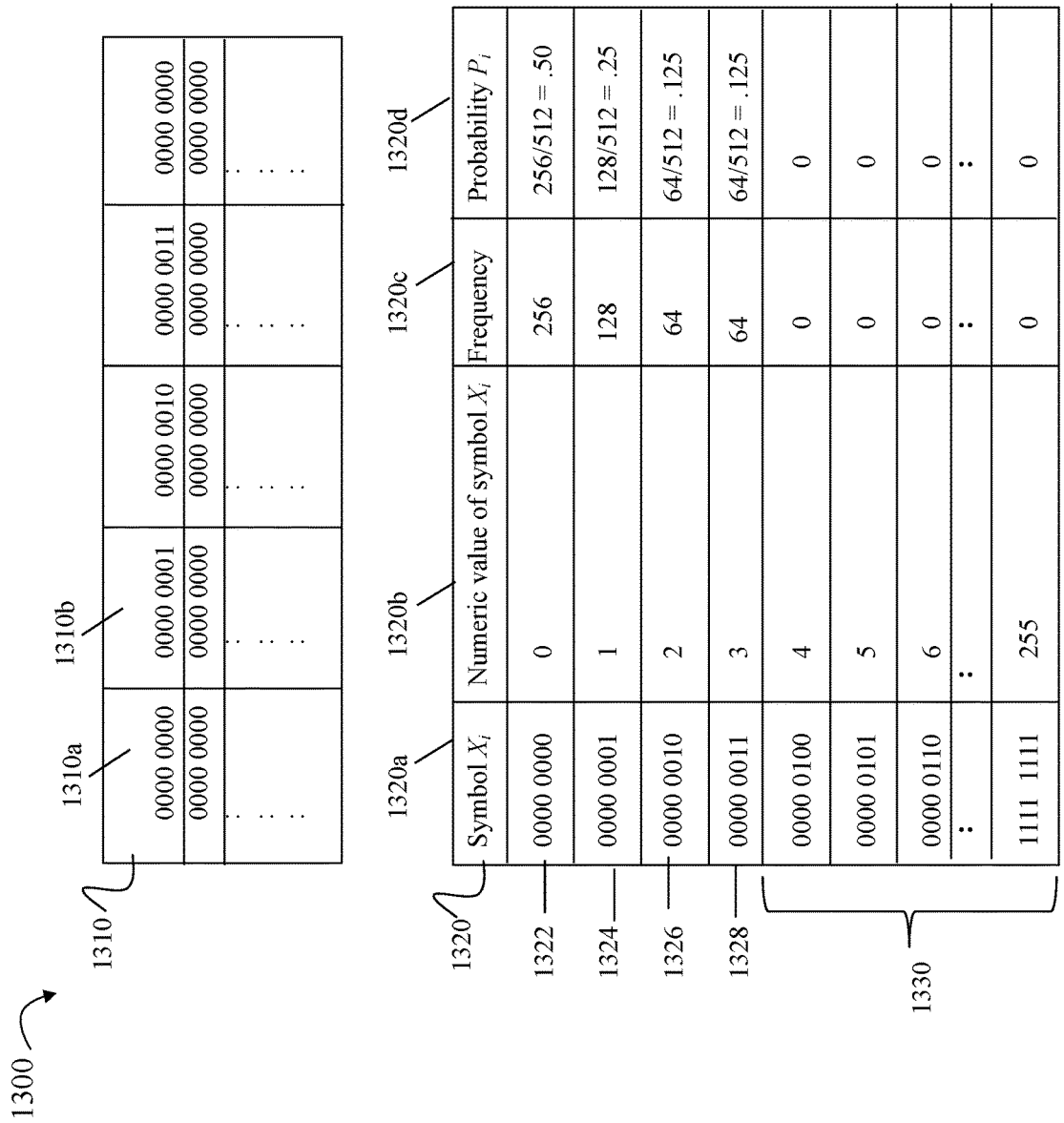
FIG. 6 is an example illustrating entropy computation in an embodiment in accordance with the techniques herein.

Referring to FIG. 6, shown is an example 1300 illustrating a sub-block and associated information that may be used in an embodiment in accordance with the techniques herein. The example 1300 includes sub-block 1310 having a size of 512 bytes. The sub-block 1310 may be partitioned into bytes or 8 bit segments where each byte denotes a symbol having a numeric value from 0 to 255, inclusively. For example, element 1310a denotes a byte or symbol having a value of 0 and element 1310b denotes a byte or symbol having a value of 1. To calculate the entropy for sub-block 1310, information in table 1320 may be determined. Table 1320 includes the following columns: symbol $X_i$ 1320a, numeric value of symbol $X_i$ 1320b, frequency of $X_i$ 1320c and probability $P_i$. Each row of 1320 includes a set of information for each unique symbol that can occur in the sub-block. Thus, the table 1320 may include 256 rows, one row for each of the unique symbols having corresponding numeric values from 0 to 255, inclusively.

The row 1322 denotes that the numeric value 0 for symbol "0000 0000" has a frequency of 256 and a probability $P_i$=0.50. The row 1324 denotes that the numeric value 1 for symbol "0000 0001" has a frequency of 128 and a probability $P_i$=0.25. The row 1326 denotes that the numeric value 2 for symbol "0000 0010" has a frequency of 64 and a probability $P_i$=0.125. The row 1328 denotes that the numeric value 3 for symbol "0000 0011" has a frequency of 64 and a probability $P_i$=0.125. The element 1330 indicates that the remaining symbols each have a frequency=0 and thus a probability $P_i$=0. Based on EQUATION 2 and using the information from table 1320 for the sub-block 1310, the calculated entropy value for sub-block 1310 is 1.75.

As noted above, the entropy function E may be used as the second hash function to calculate an entropy value for each sub-block of a candidate and target data block. In at least one embodiment, the entropy function E may calculate an entropy value for an input sub-block based on EQUATION 2 and as illustrated with an example data block in connection with FIG. 6.

Figure 7:
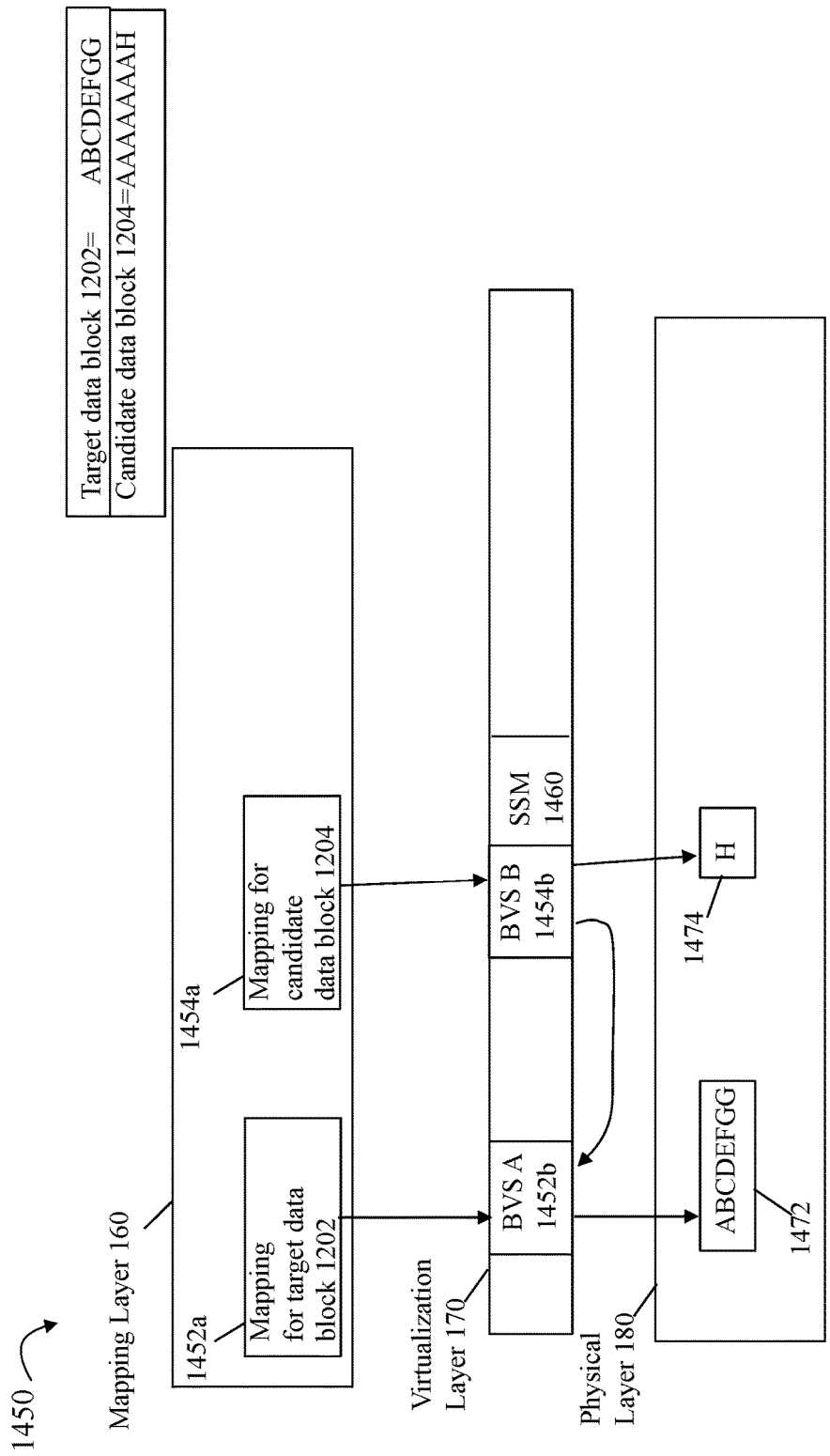
FIG. 7 is an example illustrating various metadata structures that may be used in an embodiment in accordance with techniques herein.

Referring to FIG. 7, shown is an example illustrating various structures that may be used in an embodiment in accordance with the techniques herein. The example 1450 illustrates structures that may be used to represent the state of the various layers of a system after data deduplication processing has completed for a target block 1202 and a partially deduplicated candidate block 1204. In this example, the target block may have contents for its 8 sub-blocks represented as ABCDEFGG (each letter denoting different content for a different sub-block), and the candidate block may have contents for its 8 sub-blocks represented as AAAAAAAH. In connection with the techniques herein, the SSM structure for the target block and the candidate block in the example 1450 may include the following values in respective SSM entries 0 through 7: 0,0,0,0,0,0,0,0xFF, similar to the first example described above where SSM[0] through SSM[6] indicate that sub-blocks 0-6 of the candidate match sub-block 0 of the target block; and SSM[7] indicates that candidate sub-block 7 does not match any sub-block of the target block whereby the contents of sub-block 7 may be persistently stored and not deduplicated.

Thus, the target block 1202 has its contents persistently stored and the candidate block 1204 is partially deduplicated as partially matching the target block 1202.

In at least one embodiment, the data storage system may include the mapping layer 160, the virtualization 170 and the physical layer 180. The mapping layer 160 includes metadata for mapping blocks of data objects, such as LUNs (Logical UNits), file systems, virtual machine disks, and/or the like, which may be managed by a separate namespace layer (not shown). The mapping layer 160 maps each data object to a corresponding set of one or more block virtualization structures ("BVSs") in the virtualization layer 170. In at least one embodiment, one BVS may be provided for each addressable data block in the storage system. The mapping layer 160 includes mapping information for the target block 1202 and the candidate block 1204.

In the virtualization layer 170, the BVSs enable the data storage system to deduplicate physical data blocks and to relocate physical data blocks without having to update pointers in the mapping layer 160. The physical layer 180 manages the physical data blocks of the data storage system. For example, the physical layer 180 may include data blocks of uniform size, where each data block is uniquely addressable. The physical layer 180 is configured to store host data as storage extents in the data blocks. The extents may hold compressed data or uncompressed data. Some extents may be smaller than a block, e.g., if the data are compressed and/or if only a portion of a block's data are uniquely stored. One should appreciate that the physical layer 180 is itself a logical structure and that the bits of data are actually stored on physical storage devices, such as non-volatile storage PDs 16a-n (of FIG. 1). The data storage system may include additional layers, which are not shown, such as a RAID (Redundant Array of independent (or Inexpensive) Disks) layer, additional mapping layers, and the like. The depicted arrangement is intended merely to be illustrative.

The elements 1452a and 1454a denote various mapping structures. The mapping structure 1452a provides the mapping for target block 1202 and points to BVS A 1452b located in the virtualization layer 170. The BVS A 1452b identifies, or points to, the physical location or region 1472, in the physical layer 180, at which the content for the target block 1202 is stored.

The mapping structure 1454a provides the mapping for the candidate block 1204 and points to BVS B 1454b located in the virtualization layer 170. Since the block 1204 has been partially deduplicated, the BVS B 1454b includes information identifying both the deduplicated portion of the candidate block 1204 and also identifying physical storage for the remaining content of the candidate block 1204 that was not deduplicated. The BVS B1454*b* identifies, or points, to the BVS A 1452*b* used to access the content of the target block (e.g., sub-block 0 of the target block 1202 that is identical to/matches each of the deduplicated sub-blocks 0-6 of the candidate block 1204). Additionally, the BVS B1454*b* identifies, or points, to the physical location or region 1474, in the physical layer 180, at which the content for the non-deduplicated sub-block 7 of the block 1204 is stored. Also included in the metadata of the virtualization layer 170 for the candidate block 1204 is the SSM structure 1460.

The SSM structure 1460 may be an array or vector as generally described herein. The SSM structure 1460 for the candidate block in the example 1450 may include values in respective SSM entries 0 through 7: 0,0,0,0,0,0,0,0xFF, as noted above where: SSM[0] through SSM[6] indicate that sub-blocks 0-6 of the candidate match sub-block 0 of the target block; and SSM[7] indicates that candidate sub-block 7 does not match any sub-block of the target block whereby the contents of sub-block 7 may be persistently stored and not deduplicated.

In such an embodiment, the BVS B1454*b* may identify or point to the BVS A 1452*b* used to access the target block. The SSM structure 1460 is used to further specify the mapping of deduplicated candidate sub-blocks and the particular target sub-block providing the content for each deduplicated candidate sub-block.

The example 1450 of FIG. 7 is one way in which the SSM structure may be used in connection with other metadata for a candidate data block to encode partial or sub-block level deduplication for the candidate data block with respect to a target data block. With reference back to the FIG. 3, the location field 304 of an entry in the dedupe DB 312 for a target data block may, for example, point to the mapping structure 1452*a* or the BVS A 1452*b* to access the content of the target block as stored in 1472. The candidate data block 1204 may be stored, for example, at a logical location in a file or LUN, or other storage object stored in the data storage system which may reference the mapping structure 1454*a* to access the content of the partially deduplicated candidate block 1204.

It should be noted that if an additional second target block T2 along with target block 1202 is used to deduplicate one or more sub-blocks of the candidate block 1204, in at least one embodiment, another SSM structure, SSM(B1, T2) would be included in the virtualization layer 170 denoting the mapping of T2 sub-blocks shared with B1 sub-blocks. In this case, the BVS B 1454*b*, or another BVS structure, associated with the candidate block 1204 would point to or reference the BVS structure for the T2 target block (e.g., in a manner similar to the way the BVS B1454*b* points or references BVS A 1452*b* associated with the target block 1202).

Figure 8:
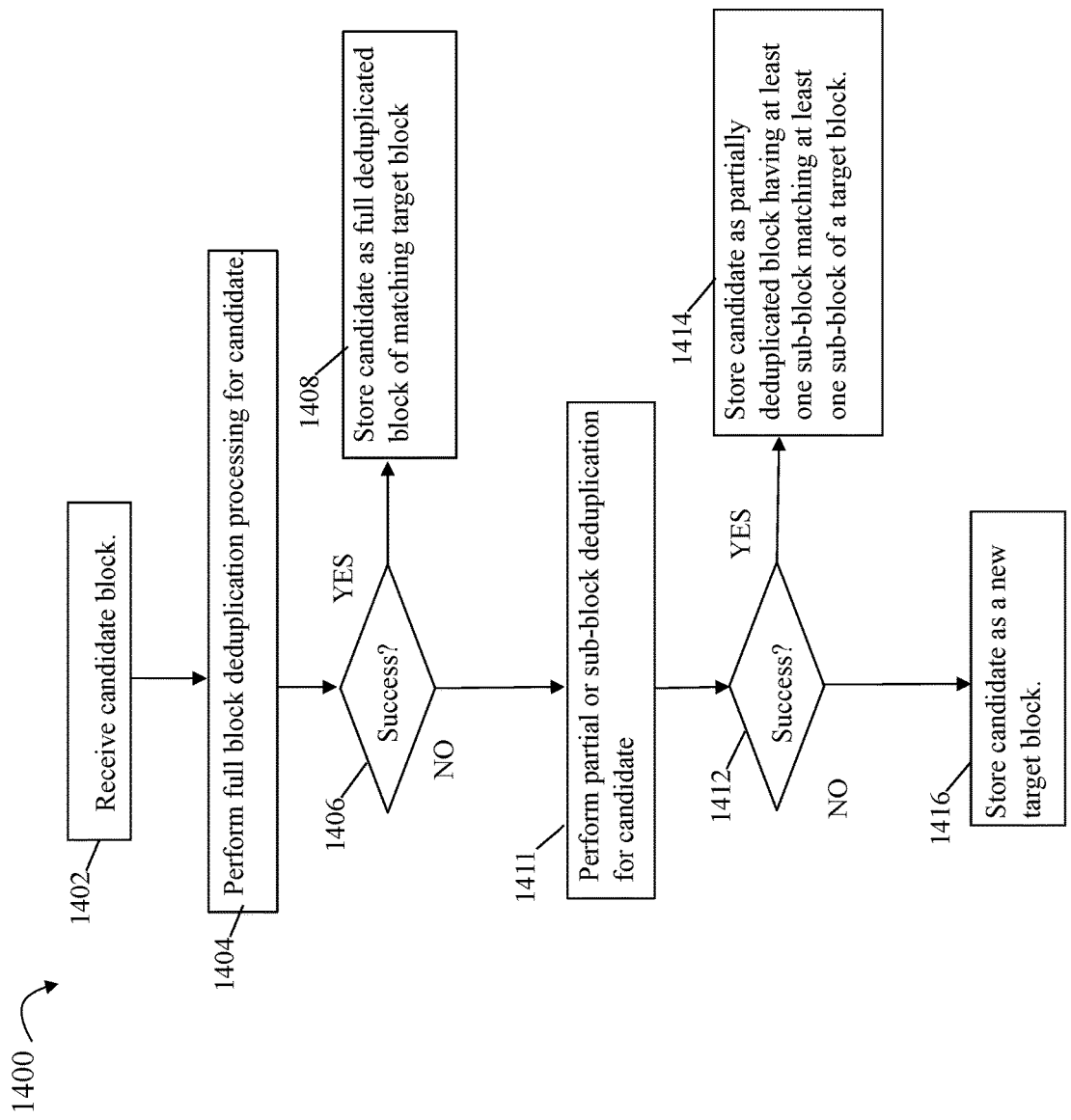
FIGS. 8, 9 and 10 are flowcharts of processing that may be performed in an embodiment in accordance with techniques herein.

Referring to FIG. 8, shown is a first flowchart 1400 of processing steps that may be performed in an embodiment in accordance with the techniques herein. The flowchart 1400 indicates processing steps that may be performed for a single candidate block whereby the steps of the flowchart 1400 may be repeated for subsequent candidate blocks.

At the step 1402, a candidate block is received. From the step 1402, control proceeds to the step 1404. At the step 1404, full block deduplication processing is performed for the candidate where the candidate is determined as a full block match of an existing target block. From the step 1404, processing proceeds to the step 1406. At the step 1406, a determination is made as to whether full block deduplication processing of step 1404 successfully located an existing target block that matches the candidate block. If the step 1406 evaluates to yes, control proceeds to the step 1408 where the candidate block is stored as a full deduplicated block of the matching target block.

If the step 1406 evaluates to no, control proceeds to the step 1411. At the step 1411, partial or sub-block deduplication processing is performed for the candidate block. From the step 1411, control proceeds to the step 1412. At the step 1412, a determination is made as to whether partial or sub-block deduplication processing of step 1411 successfully located an existing target block that having at least one sub-block matching at least one sub-block of the candidate block. If the step 1412 evaluates to yes, control proceeds to the step 1414 to store the candidate block as a deduplicated block having at least one sub-block that matches a sub-block of an existing target block. It should be noted that an embodiment may allow a single candidate block to be partially deduplicated with respect to one or more existing target blocks. If the step 1412 evaluates to no, control proceeds to the step 1416 to store the candidate as a new target block. The step 1416 may include persistently storing content of the candidate block on physical storage and also in cache. The step 1416 may include calculating one or more digest values for the new target block and storing such digest values as new entries in the dedupe DB. The one or more digest values may include the full block digest and sub-block or sector digests for the new target block.

Figure 9:
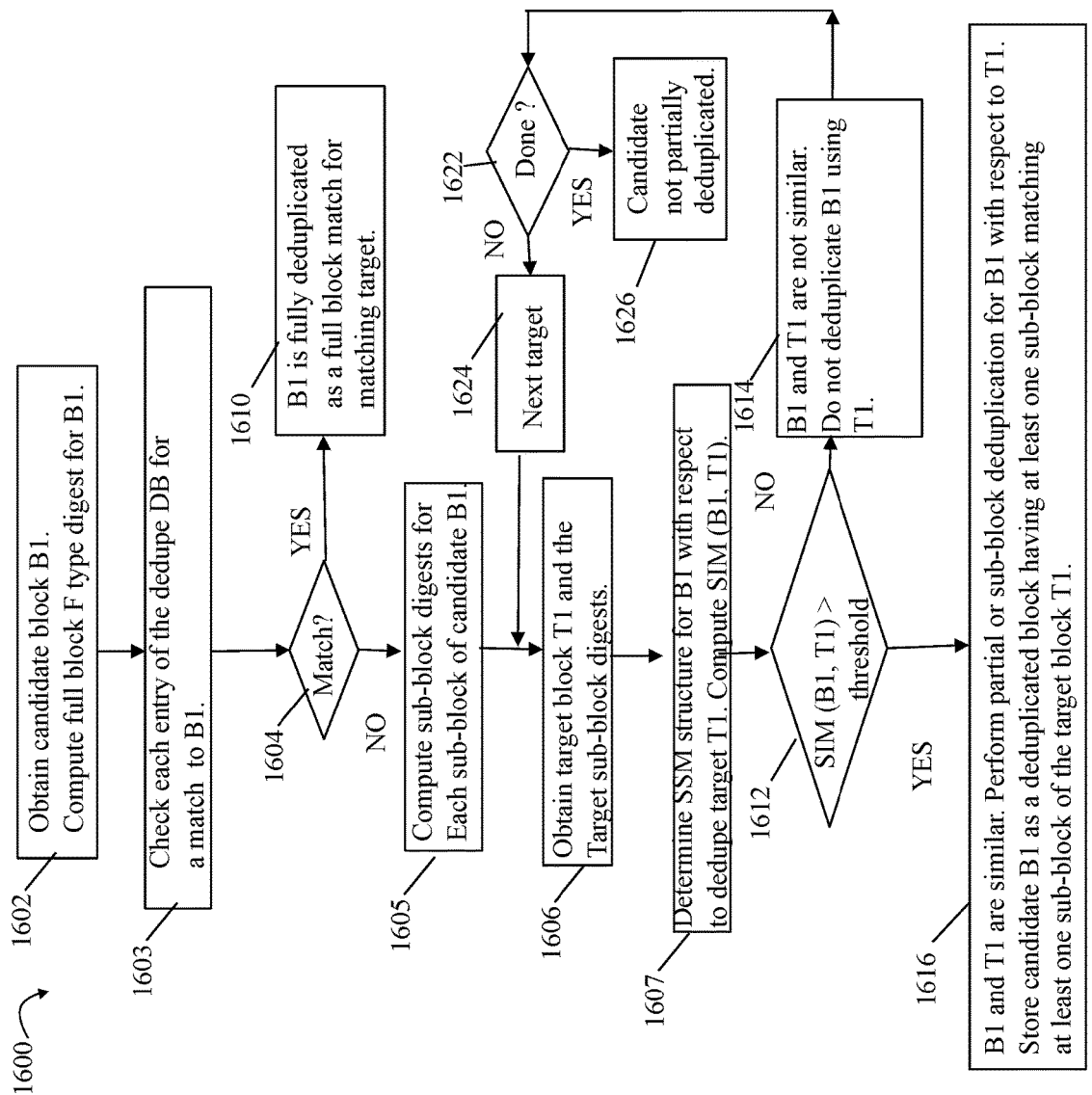

Referring to FIG. 9, shown is another flowchart 1600 of processing steps that may be performed in an embodiment in accordance with the techniques herein. The flowchart 1600 provides additional detail regarding one particular embodiment described above where processing is performed to locate and use a single target block for deduplication of a candidate block. The flowchart 1600 indicates processing steps that may be performed for a single candidate block whereby the steps of the flowchart 1600 may be repeated for subsequent candidate blocks.

At the step 1602, the candidate block B1 is obtained. The step 1602 includes computing a full block digest for the candidate block B1. As described herein the full block digest for B1 may be computed using a hash function and the full block content of B1. From the step 1602, control proceeds to the step 1603 where processing is performed to check each entry of the dedupe DB 312 for a match to B1. The step 1603 may include determining if there is an existing entry in the dedupe DB having a full block digest for a target block that matches the computed full block digest for B1 (as computed in the step 1602), and if so, comparing the actual content of the target data block having the matching entry to the content of B1. From the step 1603, control proceeds to the step 1604. At the step 1604, a determination is made as to whether a matching target block in the dedupe DB was found for the candidate block B1. If the step 1604 evaluates to yes, control proceeds to the step 1610. At the step 1610, B1 is processed as a full deduplicated block of the matching target block. The step 1610 is similar to the step 1408 of the FIG. 8. If the step 1604 evaluates to no, control proceeds to the step 1605 where processing is performed to compute the sub-block digests for each of the sub-blocks of the candidate B1. From the step 1605, control proceeds to the step 1606. At the step 1606, a target block T1 and the target sub-block digests for the target block are obtained, such as from an entry of the dedupe DB for T1. From the step 1606, control proceeds to the step 1607.

At the step 1607, processing is performed to determine the SSM structure for B1 with respect to T1 as the deduplication target. The step 1607 may include determining the SSM structure such as described above, for example, in connection with FIG. 5 and other examples, using the digests of the candidate sub-blocks (e.g., computed in the step 1605) and the digests of the target sub-blocks (e.g., obtained from the dedupe DB in the step 1606). Using the SSM structure, the step 1607 also includes computing the similarity metric SIM(B1, T1), which equals the number of sub-blocks in the candidate block B1 having content matching a sub-block of the target block T1. From the step 1607, control proceeds to the step 1612 where a determination is made as to whether the SIM(B1, T1) is more than a specified threshold. If the step 1612 evaluates to no, control proceeds to the step 1614 where it is determined that B1 and T1 are not similar. In connection with the step 1614, processing does not perform deduplication of B1 using T1. From the step 1614, control proceeds to the step 1622 where a determination is made as to whether processing of all existing target blocks has completed. If step 1622 evaluates to yes, control proceeds to the step 1626 where the candidate is not partially deduplicated and where the candidate block is stored as a new target block as denoted in the step 1416 of the FIG. 8. If the step 1622 evaluates to no, control proceeds to the step 1624 to obtain the next target block. From the step 1624, control proceeds to the step 1606 to continue partial or sub-block deduplication processing using the next target block as the current target block T1.

If the step 1612 evaluates to yes, control proceeds to the step 1616 where it is determined that B1 and T1 are similar. The step 1616 may include performing partial or sub-block deduplication for B1 with respect to T1. The step 1616 processing includes storing the candidate block B1 as a partially deduplicated block having at least one sub-block matching at least one sub-block of the target block T1. The step 1616 includes processing that is similar to the processing performed in the step 1414 of FIG. 8.

Figure 10:
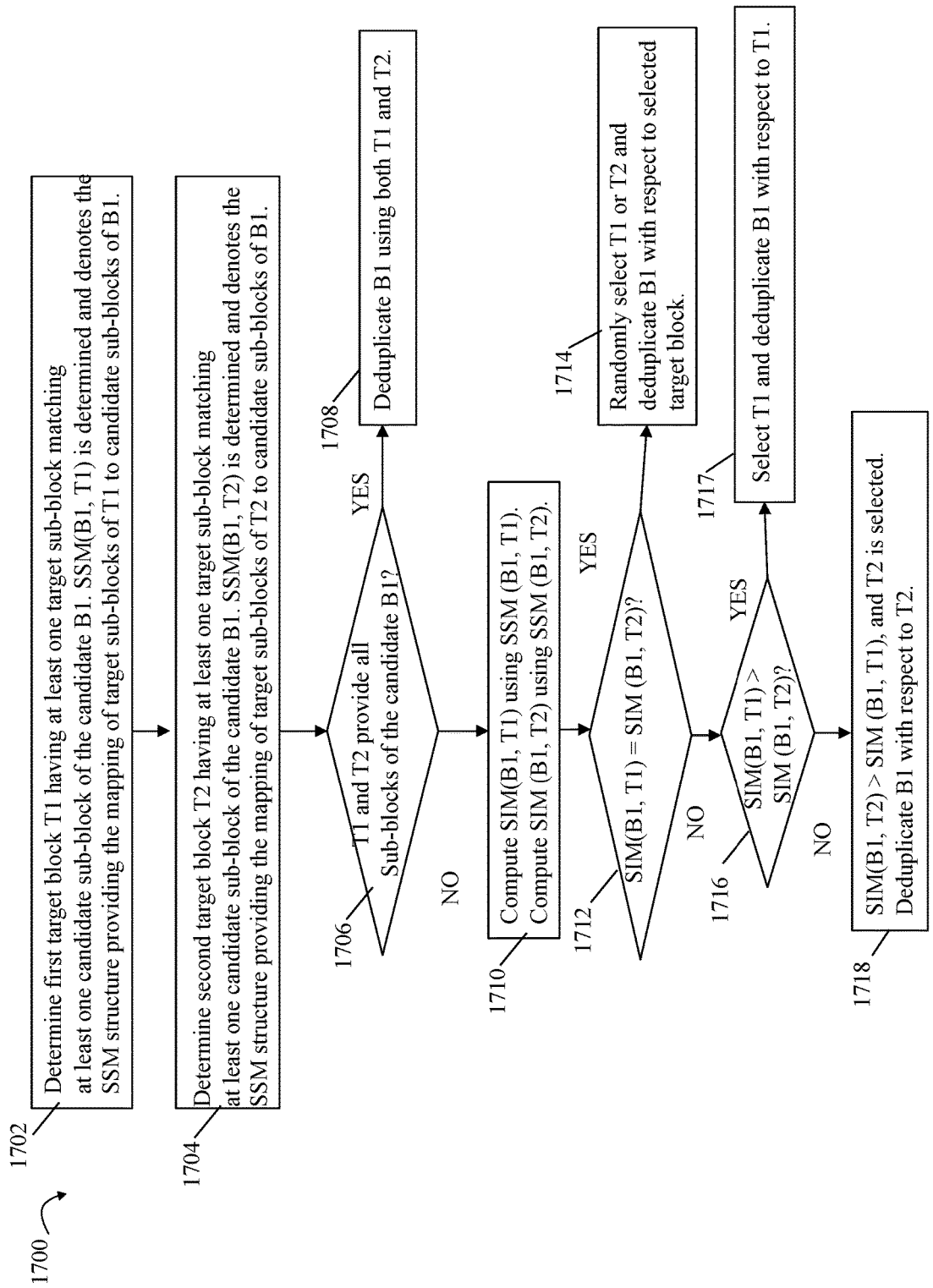

Referring to FIG. 10, shown is another flowchart 1700 of processing steps that may be performed in an embodiment in accordance with the techniques herein. The flowchart 1700 provides additional detail regarding one particular embodiment described above where processing is performed to locate two target blocks for deduplication of a candidate block. The flowchart 1700 indicates processing steps that may be performed for a single candidate block whereby the steps of the flowchart 1700 may be repeated for subsequent candidate blocks.

At the step 1702, a first target block T1 is determined that has at least one target sub-block matching at least one candidate sub-block of the candidate B1. The structure SSM(B1, T1) is determined and denotes the SSM structure as described herein providing the mapping of target sub-blocks of T1 to candidate sub-blocks of B1. From the step 1702, control proceeds to the step 1704. At the step 1704, a second target block T2 is determined that has at least one target sub-block matching at least one candidate sub-block of the candidate B1. The structure SSM(B1, T2) is determined and denotes the SSM structure as described herein providing the mapping of target sub-blocks of T2 to candidate sub-blocks of B1. From the step 1704, control proceeds to the step 1706.

At the step 1706, a determination is made as to whether T1 and T2 completely deduplicate the candidate block B1 whereby T1 and T2 provide all the sub-blocks of B1. If the step 1706 evaluates to yes, control proceeds to the step 1708. At the step 1708, processing is performed to deduplicate B1 using both T1 and T2. The step 1708 includes partially deduplicating B1 using T1 and the associated SSM(B1, T1) structure, and includes partially deduplicating B1 using T2 and the associated SSM(B1, T2) structure. If the step 1706 evaluates to no, control proceeds to the step 1710.

At the step 1710, processing is performed to compute the similarity metric SIM(B1, T1) using SSM(B1, T1), and to compute SIM (B1, T2) using SSM(B1, T2). From the step 1710, control proceeds to the step 1712 where a determination is made as to whether SIM(B1, T1)=SIM (B1, T2). If the step 1712 evaluates to yes, control proceeds to the step 1714 where processing is performed to randomly select T1 or T2 and to deduplicate B1 with respect to the selected one of the target blocks T1 or T2. If the step 1712 evaluates to no, control proceeds to the step 1716. At the step 1716, processing is performed to select one of T1 or T2 having the greater similarity metric. At the step 1716, a determination is made as to whether SIM(B1, T1)>SIM (B1, T2). If the step 1716 evaluates to yes, control proceeds to the step 1717. At the step 1717, T1 is selected and B1 is deduplicated with respect to T1, having the greater similarity metric SIM. Otherwise, if step 1716 evaluates to no, then control proceeds to the step 1718. At the step 1718, it is determined that SIM(B1, T2)>SIM (B1, T1), and T2 is selected for deduplicating B1. The step 1718 deduplicating B1 with respect to the target block T2 having the greater similarity metric SIM.

It should be generally noted that the terms digest, hash value, hash key, hash, and hash digest may be used interchangeably in various contexts herein to refer to an output generated by a hash function. In some contexts and in some embodiments, a hash value, hash or hash key may be directly output by a hash function for a particular input, and a truncated form of the hash function output may be used as the digest or hash digest for the particular input in connection with the techniques herein. For example, in at least one embodiment, the first hash function as described herein may be a cryptographic hash function that generates a hash value of a certain size such as a number of bytes. In at least one embodiment, the block digests of the column 302 of FIG. 3 may be computed using the cryptographic hash function as the first hash function, where the block digests are truncated hash values computed by the first hash function. For example, each of the block digests of the column 302 of FIG. 3 may be a specified portion of the bytes of a hash value computed by the cryptographic hash function.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
receiving a candidate block;
determining one or more sub-blocks of a target block that match one or more sub-blocks of the candidate block;
creating, in accordance with said determining, a shared sub-block mapping (SSM) structure having a plurality of entries, wherein each of the plurality of entries corresponds to a different one of the sub-blocks in the candidate block and wherein a value stored in said each entry, corresponding to one of the sub-blocks of the candidate block, identifies a sub-block of the target block matching said one sub-block of the candidate block; and storing the candidate block as a deduplicated block sharing at least one sub-block with the target block, wherein said storing includes storing the SSM structure as a metadata structure of the candidate block to identify deduplicated sub-blocks of the candidate block and to identify sub-blocks of the target block providing content for the deduplicated sub-blocks of the candidate block, and wherein the method further includes:

comparing a first digest for a first sub-block of the candidate block to one or more digests for one or more sub-blocks of the target block to determine whether the first digest matches a second of the one or more digests for the one or more sub-blocks of the target block;

responsive to determining the first digest for the first sub-block of the candidate block matches the second digest for a second sub-block of the target block, comparing the first sub-block of the candidate block to the second sub-block of the target block; and determining, in accordance with said comparing the first sub-block of the candidate block to the second sub-block of the target block, whether the first sub-block of the candidate block and the second sub-block of the target block match.

2. The method of claim 1, further comprising:
comparing each sub-block of the candidate block to one or more sub-blocks of the target block to determine whether said each sub-block of the candidate block matches one of the sub-blocks of the target block.

3. The method of claim 1, further comprising:
responsive to determining the first sub-block of the candidate block matches the second sub-block of the target block, updating an entry of the SSM structure corresponding to the first sub-block of the candidate block to indicate that the second sub-block of the target block matches the first sub-block of the candidate block.

4. The method of claim 1, wherein said updating includes storing a positional indicator of the second sub-block of the target block in the entry of the SSM structure corresponding to the first sub-block of the candidate block.

5. The method of claim 1, further comprising:
comparing a first digest for a first sub-block of the candidate block to a plurality of digests for a plurality of sub-blocks of the target block to determine whether the first digest matches any of the plurality of digests for the plurality of sub-blocks of the target block;

responsive to determining the first digest for the first sub-block of the candidate block does not match any of the plurality of digests for the plurality of sub-blocks of the target block, determining that the first sub-block does not match any of the plurality of sub-blocks of the target block; and responsive to determining, that the first sub-block does not match any of the plurality of sub-blocks of the target block, updating an entry of the SSM structure corresponding to the first sub-block of the candidate block to indicate that the first sub-block of the candidate block does match any of the plurality of sub-blocks of the candidate block.

6. The method of claim 1, wherein a plurality of entropy values for sub-blocks of the candidate block and the target block are used as a plurality of digests for sub-blocks of the candidate block and the target block, wherein each sub-block of the candidate block and each sub-block of the target block has a corresponding one of the plurality of entropy values, and wherein the first digest for the first sub-block of the candidate block and the one or more digests for one or more sub-blocks of the target block are included in the plurality of entropy values.

7. The method of claim 1, further comprising:
computing, using the SSM structure, a similarity metric with respect to the candidate block and the target block, the similarity metric indicating a number of sub-blocks in the candidate block having content matching a sub-block of the target block;

determining whether the similarity metric exceeds a threshold; and responsive to determining the similarity metric exceeds the threshold, performing said storing the candidate block as a deduplicated block sharing at least one sub-block with the target block.

8. A method of processing data comprising:
receiving a candidate block;
determining one or more sub-blocks of a target block that match one or more sub-blocks of the candidate block;

creating, in accordance with said determining, a shared sub-block mapping (SSM) structure having a plurality of entries, wherein each of the plurality of entries corresponds to a different one of the sub-blocks in the candidate block and wherein a value stored in said each entry, corresponding to one of the sub-blocks of the candidate block, identifies a sub-block of the target block matching said one sub-block of the candidate block; and storing the candidate block as a deduplicated block sharing at least one sub-block with the target block, wherein said storing includes storing the SSM structure as a metadata structure of the candidate block to identify deduplicated sub-blocks of the candidate block and to identify sub-blocks of the target block providing content for the deduplicated sub-blocks of the candidate block, wherein the target block is a first target block and wherein the SSM structure is a first SSM structure that identifies which one or more sub-blocks of the target block match which one or more sub-blocks of the candidate block, and wherein the method includes:

creating a second SSM structure that identifies which one or more sub-blocks of a second target block match which one or more sub-blocks of the candidate block, wherein the second SSM structure has a second plurality of entries, wherein each of the second plurality of entries corresponds to a different one of the sub-blocks in the candidate block and wherein a value stored in said each entry, corresponding to one of the sub-blocks of the candidate block, identifies a sub-block of the second target block matching said one sub-block of the candidate block;

determining whether all sub-blocks of the candidate block are deduplicable using the first target block and the second target block whereby each sub-block of the candidate block matches another sub-block in either the first target block or the second target block; and responsive to determining that all sub-blocks of the candidate block are deduplicable using the first target block and the second target block, storing the candidate block as a deduplicated block sharing at least one sub-block with the first target block and at least one sub-block with the second target block, wherein said storing includes storing the first SSM structure and the second SSM structure as metadata structures of the candidate block to identify deduplicated sub-blocks of the candidate block and to identify sub-blocks of the first target block and the second target block providing content for the deduplicated sub-blocks of the candidate block.

9. The method of claim 8, further comprising:
responsive to determining that all sub-blocks of the candidate block are not deduplicable using the first target block and the second target block, whereby at least one sub-block of the candidate block does not match any sub-block of the first target block or the second target block, performing first processing to select one of the first target block and the second target block to be used in deduplicating the candidate block.

10. The method of claim 9, wherein the first processing includes:
computing, using the first SSM structure, a first similarity metric with respect to the candidate block and the first target block, the first similarity metric indicating a number of sub-blocks in the candidate block having content matching a sub-block of the first target block;
computing, using the second SSM structure, a second similarity metric with respect to the candidate block and the second target block, the second similarity metric indicating a number of sub-blocks in the candidate block having content matching a sub-block of the second target block;
comparing the first similarity metric and the second similarity metric; and
selecting, in accordance with said comparing the first similarity metric and the second similarity metric, one of the first target block and the second target block to be used in deduplicating the candidate block.

11. The method of claim 10, wherein the first similarity metric is greater than the second similarity metric and said selecting selects the first target block to be used in deduplicating the candidate block.

12. The method of claim 10, wherein if said comparing determines that the second similarity metric is greater than the first similarity metric, said selecting selects the second target block to be used in deduplicating the candidate block.

13. The method of claim 10, wherein if the first similarity metric is equal to the second similarity metric, said selecting randomly selects one of the first target block and the second target block to be used in deduplicating the candidate block.

14. A system comprising:
a processor; and
a memory comprising code stored thereon that, when executed, performs a method of processing data comprising:
receiving a candidate block;
determining one or more sub-blocks of a target block that match one or more sub-blocks of the candidate block;
creating, in accordance with said determining, a shared sub-block mapping (SSM) structure having a plurality of entries, wherein each of the plurality of entries corresponds to a different one of the sub-blocks in the candidate block and wherein a value stored in said each entry, corresponding to one of the sub-blocks of the candidate block, identifies a sub-block of the target block matching said one sub-block of the candidate block; and
storing the candidate block as a deduplicated block sharing at least one sub-block with the target block, wherein said storing includes storing the SSM structure as a metadata structure of the candidate block to identify deduplicated sub-blocks of the candidate block and to identify sub-blocks of the target block providing content for the deduplicated sub-blocks of the candidate block, and wherein the method further includes:
comparing a first digest for a first sub-block of the candidate block to one or more digests for one or more sub-blocks of the target block to determine whether the first digest matches a second of the one or more digests for the one or more sub-blocks of the target block;
responsive to determining the first digest for the first sub-block of the candidate block matches the second digest for a second sub-block of the target block, comparing the first sub-block of the candidate block to the second sub-block of the target block; and
determining, in accordance with said comparing the first sub-block of the candidate block to the second sub-block of the target block, whether the first sub-block of the candidate block and the second sub-block of the target block match.

15. A computer readable medium comprising code stored thereon that, when executed, performs a method of processing data comprising:
receiving a candidate block;
determining one or more sub-blocks of a target block that match one or more sub-blocks of the candidate block;
creating, in accordance with said determining, a shared sub-block mapping (SSM) structure having a plurality of entries, wherein each of the plurality of entries corresponds to a different one of the sub-blocks in the candidate block and wherein a value stored in said each entry, corresponding to one of the sub-blocks of the candidate block, identifies a sub-block of the target block matching said one sub-block of the candidate block; and
storing the candidate block as a deduplicated block sharing at least one sub-block with the target block, wherein said storing includes storing the SSM structure as a metadata structure of the candidate block to identify deduplicated sub-blocks of the candidate block and to identify sub-blocks of the target block providing content for the deduplicated sub-blocks of the candidate block, and wherein the method further includes:
comparing a first digest for a first sub-block of the candidate block to one or more digests for one or more sub-blocks of the target block to determine whether the first digest matches a second of the one or more digests for the one or more sub-blocks of the target block;
responsive to determining the first digest for the first sub-block of the candidate block matches the second digest for a second sub-block of the target block, comparing the first sub-block of the candidate block to the second sub-block of the target block; and
determining, in accordance with said comparing the first sub-block of the candidate block to the second sub-block of the target block, whether the first sub-block of the candidate block and the second sub-block of the target block match.

16. The computer readable medium of claim 15, wherein the method further comprises:
comparing each sub-block of the candidate block to one or more sub-blocks of the target block to determine whether said each sub-block of the candidate block matches one of the sub-blocks of the target block.

17. The computer readable medium of claim 15, wherein the method further comprises:

responsive to determining the first sub-block of the candidate block matches the second sub-block of the target block, updating an entry of the SSM structure corresponding to the first sub-block of the candidate block to indicate that the second sub-block of the target block matches the first sub-block of the candidate block.

18. The computer readable medium of claim 15, wherein said updating includes storing a positional indicator of the second sub-block of the target block in the entry of the SSM structure corresponding to the first sub-block of the candidate block.

19. A computer readable medium comprising code stored thereon, that when executed, performs a method of processing data comprising:
receiving a candidate block;
determining one or more sub-blocks of a target block that match one or more sub-blocks of the candidate block;
creating, in accordance with said determining, a shared sub-block mapping (SSM) structure having a plurality of entries, wherein each of the plurality of entries corresponds to a different one of the sub-blocks in the candidate block and wherein a value stored in said each entry, corresponding to one of the sub-blocks of the candidate block, identifies a sub-block of the target block matching said one sub-block of the candidate block; and
storing the candidate block as a deduplicated block sharing at least one sub-block with the target block, wherein said storing includes storing the SSM structure as a metadata structure of the candidate block to identify deduplicated sub-blocks of the candidate block and to identify sub-blocks of the target block providing content for the deduplicated sub-blocks of the candidate block, wherein the target block is a first target block and wherein the SSM structure is a first SSM structure that identifies which one or more sub-blocks of the target block match which one or more sub-blocks of the candidate block, and wherein the method includes:
creating a second SSM structure that identifies which one or more sub-blocks of a second target block match which one or more sub-blocks of the candidate block, wherein the second SSM structure has a second plurality of entries, wherein each of the second plurality of entries corresponds to a different one of the sub-blocks in the candidate block and wherein a value stored in said each entry, corresponding to one of the sub-blocks of the candidate block, identifies a sub-block of the second target block matching said one sub-block of the candidate block;
determining whether all sub-blocks of the candidate block are deduplicable using the first target block and the second target block whereby each sub-block of the candidate block matches another sub-block in either the first target block or the second target block; and
responsive to determining that all sub-blocks of the candidate block are deduplicable using the first target block and the second target block, storing the candidate block as a deduplicated block sharing at least one sub-block with the first target block and at least one sub-block with the second target block, wherein said storing includes storing the first SSM structure and the second SSM structure as metadata structures of the candidate block to identify deduplicated sub-blocks of the candidate block and to identify sub-blocks of the first target block and the second target block providing content for the deduplicated sub-blocks of the candidate block.

20. A system comprising:
a processor; and
a memory comprising code stored thereon that, when executed, performs a method of processing data comprising:
receiving a candidate block;
determining one or more sub-blocks of a target block that match one or more sub-blocks of the candidate block;
creating, in accordance with said determining, a shared sub-block mapping (SSM) structure having a plurality of entries, wherein each of the plurality of entries corresponds to a different one of the sub-blocks in the candidate block and wherein a value stored in said each entry, corresponding to one of the sub-blocks of the candidate block, identifies a sub-block of the target block matching said one sub-block of the candidate block; and
storing the candidate block as a deduplicated block sharing at least one sub-block with the target block, wherein said storing includes storing the SSM structure as a metadata structure of the candidate block to identify deduplicated sub-blocks of the candidate block and to identify sub-blocks of the target block providing content for the deduplicated sub-blocks of the candidate block, wherein the target block is a first target block and wherein the SSM structure is a first SSM structure that identifies which one or more sub-blocks of the target block match which one or more sub-blocks of the candidate block, and wherein the method includes:
creating a second SSM structure that identifies which one or more sub-blocks of a second target block match which one or more sub-blocks of the candidate block, wherein the second SSM structure has a second plurality of entries, wherein each of the second plurality of entries corresponds to a different one of the sub-blocks in the candidate block and wherein a value stored in said each entry, corresponding to one of the sub-blocks of the candidate block, identifies a sub-block of the second target block matching said one sub-block of the candidate block;
determining whether all sub-blocks of the candidate block are deduplicable using the first target block and the second target block whereby each sub-block of the candidate block matches another sub-block in either the first target block or the second target block; and
responsive to determining that all sub-blocks of the candidate block are deduplicable using the first target block and the second target block, storing the candidate block as a deduplicated block sharing at least one sub-block with the first target block and at least one sub-block with the second target block, wherein said storing includes storing the first SSM structure and the second SSM structure as metadata structures of the candidate block to identify deduplicated sub-blocks of the candidate block and to identify sub-blocks of the first target block and the second target block providing content for the deduplicated sub-blocks of the candidate block.

* * * * *